United States Patent
Chan et al.

(10) Patent No.: US 10,222,265 B2
(45) Date of Patent: Mar. 5, 2019

(54) THERMOMECHANICAL DEVICE FOR MEASURING ELECTROMAGNETIC RADIATION

(71) Applicant: OBSIDIAN SENSORS, INC., La Jolla, CA (US)

(72) Inventors: Edward Chan, San Diego, CA (US); Bing Wen, Poway, CA (US)

(73) Assignee: OBSIDIAN SENSORS, INC., San Diego, CA (US)

(*) Notice: Subject to any disclaimer, the term of this patent is extended or adjusted under 35 U.S.C. 154(b) by 0 days.

(21) Appl. No.: 15/241,742

(22) Filed: Aug. 19, 2016

(65) Prior Publication Data
US 2018/0052056 A1    Feb. 22, 2018

(51) Int. Cl.
*G01J 5/02*    (2006.01)
*G01J 5/40*    (2006.01)

(52) U.S. Cl.
CPC .............. *G01J 5/023* (2013.01); *G01J 5/024* (2013.01); *G01J 5/40* (2013.01)

(58) Field of Classification Search
CPC ............................... G01J 5/0205; G01B 11/16
See application file for complete search history.

(56) References Cited

U.S. PATENT DOCUMENTS

| | | | | |
|---|---|---|---|---|
| 5,844,238 A * | 12/1998 | Sauer | ................. | C07D 405/06 250/332 |
| 6,080,988 A * | 6/2000 | Ishizuya | ................. | G01J 5/06 250/330 |
| 6,118,124 A * | 9/2000 | Thundat | ................. | G01J 1/04 250/332 |
| 6,175,443 B1 * | 1/2001 | Aksyuk | ................. | G02B 6/3518 359/290 |
| 6,229,683 B1 * | 5/2001 | Goodwin-Johansson | ................. | H01H 59/0009 361/207 |
| 6,229,684 B1 * | 5/2001 | Cowen | ................. | F03G 7/06 361/277 |
| 6,233,088 B1 * | 5/2001 | Roberson | ................. | G01S 17/74 359/224.1 |
| 6,236,491 B1 * | 5/2001 | Goodwin-Johansson | ................. | B81C 1/00666 359/230 |
| 6,239,685 B1 * | 5/2001 | Albrecht | ................. | G11C 23/00 251/129.02 |
| 6,275,325 B1 * | 8/2001 | Sinclair | ................. | B81B 3/0024 359/290 |
| 6,339,219 B1 * | 1/2002 | Ishizuya | ................. | G01J 5/40 250/330 |

(Continued)

FOREIGN PATENT DOCUMENTS

| | | |
|---|---|---|
| CN | 104458011 A | 3/2015 |
| CN | 104792420 A | 7/2015 |

*Primary Examiner* — David Porta
*Assistant Examiner* — Djura Malevic
(74) *Attorney, Agent, or Firm* — Morrison & Foerster LLP

(57) ABSTRACT

Methods and devices are disclosed for sensing radiation emitted by an object. For example, one device includes a substrate and a movable layer coupled to the substrate. The movable layer is configured to receive radiation from the object and move relative to the substrate to a position in response to a change in temperature. The device also includes a sensor that is configured to produce a signal responsive to the position of the movable layer. The signal is indicative of the radiation emitted by the object.

25 Claims, 17 Drawing Sheets

(56) References Cited

U.S. PATENT DOCUMENTS

| | | | |
|---|---|---|---|
| 6,396,677 B1* | 5/2002 | Chua | H01G 5/16 361/277 |
| 6,456,420 B1* | 9/2002 | Goodwin-Johansson | B81B 3/0018 333/246 |
| 6,469,301 B1* | 10/2002 | Suzuki | G01J 5/38 250/336.1 |
| 6,621,083 B2* | 9/2003 | Cole | G01J 5/20 250/338.1 |
| 6,805,839 B2* | 10/2004 | Cunningham | G01J 3/0259 374/100 |
| 6,835,932 B2* | 12/2004 | Ishizuya | B81B 3/0081 250/336.1 |
| 7,006,276 B2* | 2/2006 | Starkweather | G02B 26/0841 345/85 |
| 7,177,065 B2* | 2/2007 | Ishizuya | G02B 6/2813 359/224.1 |
| 7,184,200 B2* | 2/2007 | Dalakos | G01J 1/04 250/338.1 |
| 7,196,599 B2* | 3/2007 | Dabbaj | H02N 1/006 200/181 |
| 7,205,941 B2* | 4/2007 | Wang | H01Q 3/44 343/700 MS |
| 7,369,296 B2* | 5/2008 | Floyd | G02B 26/001 359/223.1 |
| 7,385,744 B2* | 6/2008 | Kogut | B81B 3/0072 359/198.1 |
| 7,532,377 B2* | 5/2009 | Miles | G02B 26/0841 345/107 |
| 7,535,003 B2* | 5/2009 | Honda | H01L 27/14649 250/330 |
| 7,580,175 B2* | 8/2009 | Aksyuk | G01J 5/40 250/338.1 |
| 7,692,147 B2* | 4/2010 | Hu | G01N 21/3151 250/336.1 |
| 7,705,307 B1* | 4/2010 | Zhao | G01J 5/08 250/338.1 |
| 7,705,309 B1* | 4/2010 | Jin | G01J 5/08 250/330 |
| 7,786,829 B2* | 8/2010 | Prechtel | H01H 59/0009 200/181 |
| 7,825,381 B2* | 11/2010 | Erdtmann | G01J 5/02 250/339.02 |
| 7,826,504 B2* | 11/2010 | Chen | H03C 7/027 343/700 MS |
| 7,835,061 B2* | 11/2010 | Kogut | B81B 3/0072 359/290 |
| 7,851,759 B2* | 12/2010 | Aksyuk | G01J 5/02 250/338.1 |
| 8,450,690 B2* | 5/2013 | Averitt | G01J 3/42 250/341.1 |
| 9,134,527 B2* | 9/2015 | Lee | B81B 7/0006 |
| 2002/0179837 A1* | 12/2002 | Ray | G01J 1/42 250/338.1 |
| 2005/0011256 A1* | 1/2005 | Hoh | G01Q 60/38 73/105 |
| 2005/0133721 A1* | 6/2005 | Kim | G01J 5/02 250/338.1 |
| 2006/0131500 A1* | 6/2006 | Dalakos | G01J 1/04 250/338.1 |
| 2006/0133961 A1* | 6/2006 | Lim | G01J 5/40 422/88 |
| 2006/0284774 A1* | 12/2006 | Salsman | G01R 23/163 343/703 |
| 2007/0262256 A1* | 11/2007 | Lee | G01J 5/02 250/338.1 |
| 2009/0001271 A1* | 1/2009 | Erdtmann | G01J 5/02 250/347 |
| 2009/0009853 A1* | 1/2009 | Tonucci | G02F 1/015 359/298 |
| 2009/0262778 A1* | 10/2009 | Ikushima | G01J 5/02 374/121 |
| 2010/0025581 A1* | 2/2010 | Aksyuk | G01J 5/02 250/332 |
| 2012/0057616 A1* | 3/2012 | Padilla | G01J 3/2803 374/179 |
| 2012/0261575 A1* | 10/2012 | Averitt | G01J 3/42 250/332 |

* cited by examiner

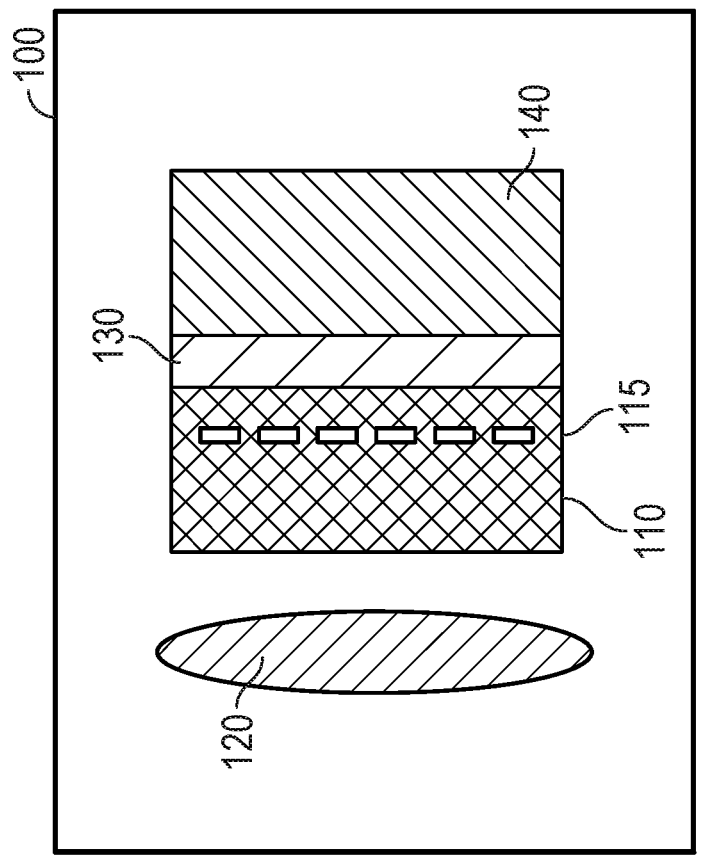
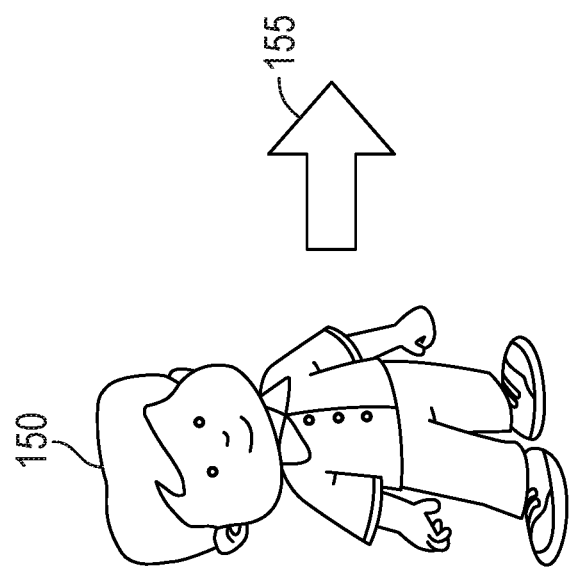
FIG. 1

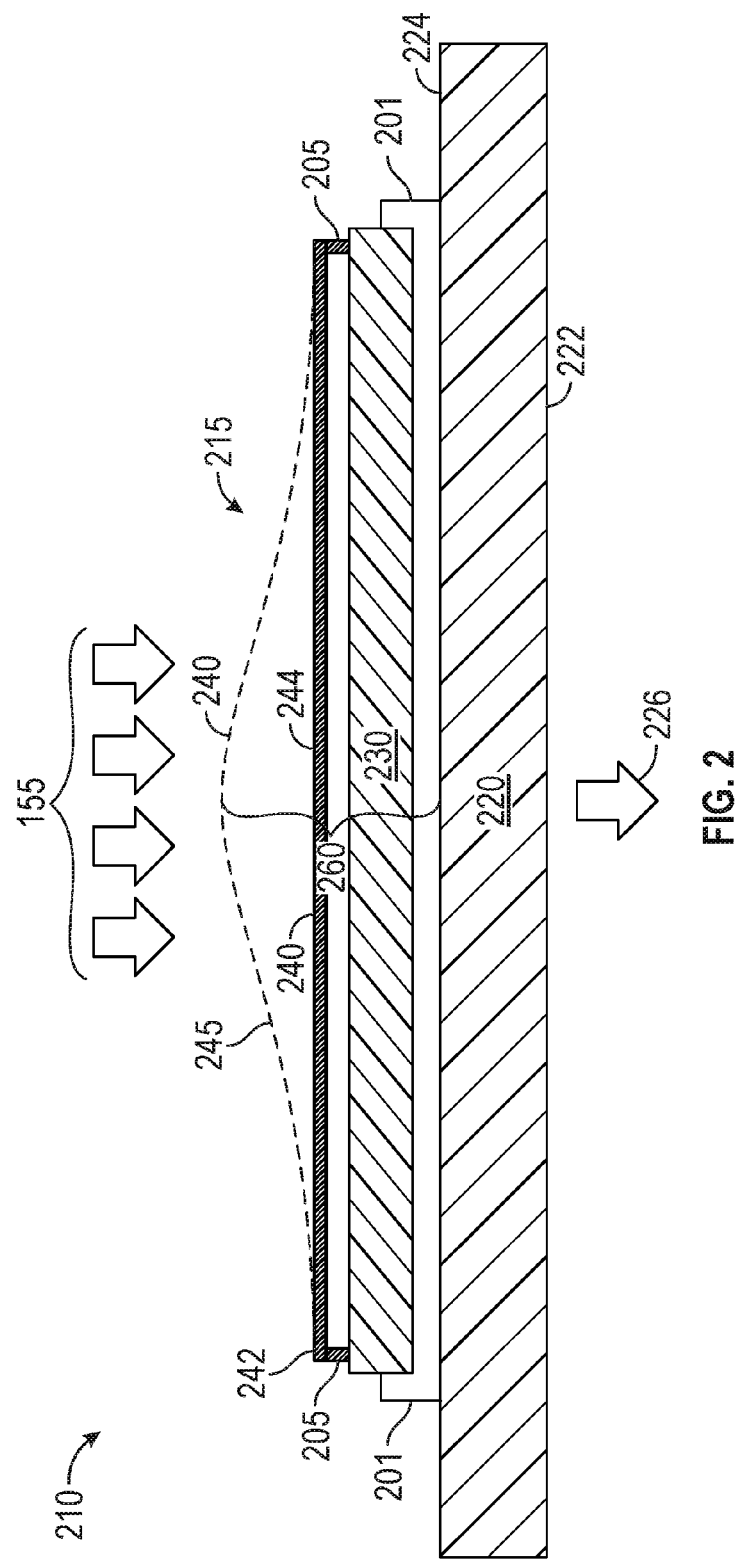

THERMOMECHANICAL DEVICE FOR MEASURING ELECTROMAGNETIC RADIATION

FIELD

The systems and methods disclosed herein are directed to thermal imaging sensors.

BACKGROUND

Instruments for detecting and imaging the power of incident electromagnetic radiation, for example thermal or infrared ("IR") radiation, are becoming increasingly important for a variety of commercial and non-commercial applications. For example, thermal imaging has been used to detect changes in temperature in or across physical constructions such as buildings, bridges, and power lines. In such applications, an increase in temperature may be indicative of impending failure. Similarly, thermal imaging has numerous medical applications, military, surveillance, and other imaging applications.

Various devices exist that may be utilized in an instrument to measure incident electromagnetic radiation. These devices may be implemented in infrared detectors, for example, a thermal imaging camera or bolometer. In such devices, incident electromagnetic radiation may be measured via the heating of a material with a temperature-dependent-electrical resistance (e.g., resistive bolometric sensors), or in some cases with a temperature-dependent structural deformation characteristic (e.g., thermomechanical bolometric sensors). One problem with the existing approaches is that ambient radiation may saturate these conventional bolometers, making it difficult to detect a small change in electromagnetic radiation emitted from an object. Accordingly, it would be advantageous for devices that detect radiation emitted from an object to reduce the effects of the ambient temperatures and thermally isolate the various components of the detectors.

SUMMARY

The system, methods, and devices of the disclosure each have several innovative aspects, no single one of which is solely responsible for the desirable attributes disclosed herein. Combinations of the innovations, aspects, and features described herein can be incorporated in various embodiments of systems, methods, and devices, and such combinations are not limited by the examples of embodiments described herein, including the summary described below.

Some embodiments may include a device for sensing radiation emitted by an object. The device may include a substrate and a movable layer coupled to the substrate. The movable layer can be configured to receive radiation from the object and move relative to the substrate to a position in response to a change in temperature. The device may also include a sensor that is configured to produce a signal responsive to the position of the movable layer. In some embodiments, the signal may be indicative of the radiation emitted by the object.

In some embodiments, the movable layer may include an absorber layer that is configured to absorb infrared radiation. In at least one embodiment, the movable layer may further include a reflector that is at least partially transmissive and partially reflective to visible light. The device may also include a visible light absorber layer between the reflector and the first side of the substrate, and the sensor may include a light sensing element configured to detect an optical signal indicative of the position of the movable layer. The substrate may include a first side and a second side, the second side being positioned proximate to the movable layer and the first side being positioned distal to the movable layer. In another embodiment, either alternatively or in combination, the movable layer may include a conductive layer positioned between the absorber layer and the second side of the substrate. In this embodiment, the sensor may include a conductor on the second side of the substrate and in electrical communication with the conductive layer. The sensor can be configured to produce the signal based on a difference in capacitance as measured between the conductive layer and the sensor.

In some embodiments, the device may also include a frame. The frame may be coupled to the substrate and the movable layer may be coupled to the frame. In various embodiments, the frame may be thermally isolated from the substrate. In other embodiments, alternatively or in combination, the frame may be thermally isolated from the movable layer. In some embodiments, the movable layer may be configured to move relative to the frame in response to radiation emitted by the object, and the frame may be configured to move relative to the substrate in response to ambient radiation incident on the device.

In some embodiments, the device may include one or more beams that each have a first end and a second end. In some embodiments including a frame, the first end of the beams may be coupled to the frame, and the second end of each beam may be coupled to the movable layer. In one embodiment, coupling of the second end of the beam to the movable layer may be configured to conduct thermal energy from the movable layer to the beam. Each beam may be configured to deform in response to a temperature change of the beam. In some embodiments, deforming the beams moves the movable relative to the substrate. In another embodiment, alternatively or in combination, coupling between each beam and the frame may thermally isolate the frame from the coupled beam. In some embodiments, the beams may have a mechanical discontinuity that causes the beam to change the position of the movable layer relative to the substrate in response to the temperature change of the beam.

In some embodiments, the movable layer may include multiple planar structures that are each coupled to one or more of the beams. The planar structures may be arranged in a square-shaped configuration or a triangular-shaped configuration, among other configurations. In some embodiments, the movable layer may include multiple movable layers, and the sensor may be configured to produce a signal responsive to the position of each the movable layers. The device may also be able to save information corresponding to the signals to a memory component. In some embodiments, alternatively or in combination, the frame may include multiple frame elements. Each frame element may correspond to one of the movable layers. In one embodiment, alternatively or in combination, the frame elements and corresponding movable layers may be arranged in a two dimensional array.

According to another aspect, a method for sensing radiation emitted by an object is disclosed. This method may include receiving radiation on a substrate. The method may also include receiving radiation from the object on a movable layer coupled to the substrate. The method may further include producing a signal, by a sensor, responsive to a change in position of the movable layer relative to the substrate in response to a change in temperature. The signal may be indicative of the radiation emitted by the object.

In some embodiments, the movable layer may be coupled to the substrate by a beam. The movable layer may be configured to conduct thermal energy from the movable layer to the beam, causing the beam to deform in response to a change in temperature. The deformation of the beam may cause the movable layer to move relative to the substrate. In one embodiment, alternatively or in combination, the movable layer may be coupled to a frame and the frame may be coupled to the substrate by a hinge configured to isolate the frame from contraction and expansion in the substrate.

According to another aspect, a device for sensing radiation emitted by an object is disclosed. This device may include first means for receiving radiation and second means for receiving radiation. The second means for receiving radiation is coupled to the first means for receiving radiation. The device also includes means for producing a signal responsive to a change in position of the second means for receiving radiation relative to the first means for receiving radiation. The signal may be indicative of the radiation emitted by the object.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 1 is a schematic block diagram of an example thermal imaging device comprising a focal plane array ("FPA") in accordance with embodiments described in the present description.

FIG. 2 schematically illustrates a cross-sectional view of certain example aspects of one embodiment of an FPA in accordance with some embodiments.

DETAILED DESCRIPTION

Figure 3A:
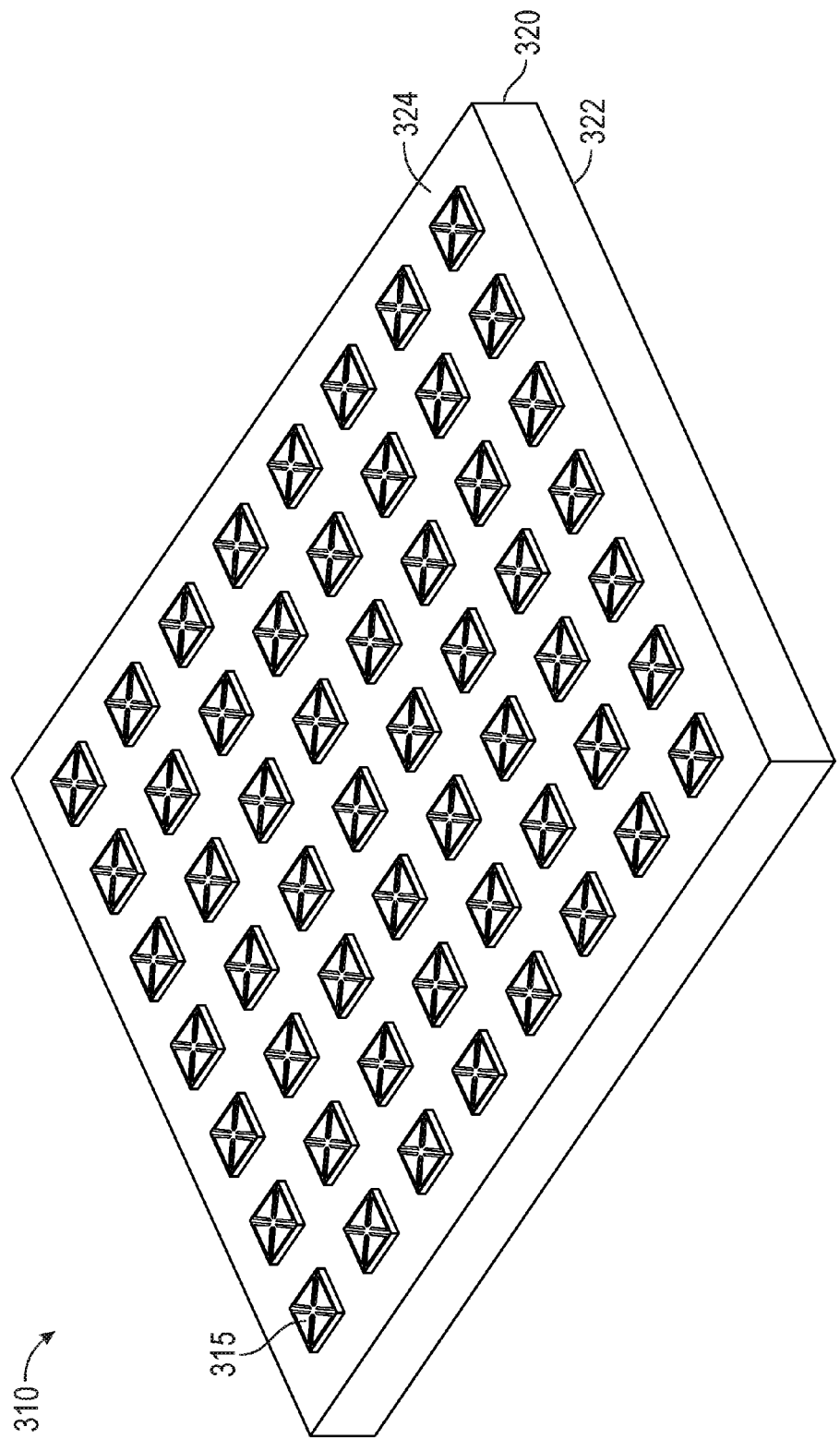
FIGS. 3A-3C illustrate perspective views of another example FPA comprising a plurality of sensors in accordance with one embodiment.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures, and techniques may be shown in detail to further explain the examples. Combinations of the examples, aspects, and features described herein can be incorporated in the various embodiments of systems, methods, and devices described herein, and such combinations are not limited by the examples of embodiments described herein.

Bolometric sensors may include one or more absorptive elements that absorb radiation. An absorptive element may be, in some embodiments, a thin layer of metal, connected to a thermal reservoir (a body of constant, or near-constant, temperature) through a thermal link. The result of such a configuration is that radiation incident on an absorptive element raises the temperature of the absorptive element above that of the reservoir (the greater the absorbed power, the higher the temperature). The temperature change can be measured directly, for example, with an attached resistor, or the resistance of the absorptive element itself. Thus, as infrared radiation strikes an individual bolometer absorptive element, the element increases in temperature, and its electrical resistance changes. This resistance change is measured and then processed into temperature values that can be represented graphically in an infrared image. However, some bolometers may be unable to detect a small change in temperature at an object where the ambient temperature is high. For example, ambient radiation may raise the temperature of the traditional bolometer to 100°, but the radiation of the object may cause a temperature rise of approximately 0.1° at the detector. Thus, an object may impart a 0.1° temperature change, which for some implementations of a bolometer, may not be detectable by the bolometer because it is currently saturated due to the ambient temperature. To compensate for this, traditional resistive bolometers may include reference pixels along the edges of the sensor array. One non-limiting advantage of the embodiments of thermomechanical bolometers described herein is that the bolometers may be configured for compensation for ambient temperatures at every pixel of the sensor array. Some implementations of thermomechanical bolometers described herein may be useful in automotive or robotic applications where ambient temperatures may be high and the thermomechanical bolometers may be used to detect humans, animals, or other objects emitting temperature changes.

The embodiments disclosed herein describe methods, devices, and systems configured to detect and generate a signal indicative of a temperature difference in an object based on an amount of radiation emitted by the object. The embodiments herein also describe a thermomechanical infrared ("IR") focal plane array ("FPA") that may be implemented in an infrared detecting device, for example for use in a thermal imaging camera. In some embodiments, the FPA may include a substrate configured to receive incident radiation and move in response to a temperature change in the substrate due to the received radiation.

In certain embodiments, a device for sensing radiation may also include a frame that is coupled to the substrate on the radiation receiving side of the substrate. The frame may be coupled to the substrate by a connecting structure that permits the frame to move in response to temperature changes in the frame due to the incident radiation. The connecting structure may also isolate, either completely or at least partially, the frame structure from movement of the substrate, for example, due to thermal changes. The frame may be coupled to one or more signal elements comprising one or more movable layers (also referred to as sensing elements throughout the present application) and one or more beams. The movable layer may include a plurality of planar structures that are each coupled to the one or more beams. The beams may couple the one or more movable layers to the frame and may be configured to bend proportionally with a temperature difference between the beam and the frame. The movable layers can be configured to move relative to the frame in response to a temperature change in the one or more movable layers due to incident radiation. The amount that the movable layers move may be based on the bend in the beam and may be representative of a temperature change in the object (e.g., the amount of radiation emitted by the object). In some embodiments, the focal plane array includes a plurality of sensors (which, for example, may each represent a plurality of pixels in a thermal imaging device) that are made up of a combination of one or more of the above components, as described below in the present disclosure. For example, each sensor may include a plurality of movable layers, each movable layer being independently movable relative to each other.

One non-limiting advantage of the embodiments disclosed herein is that the devices may be configured to self compensate to correct for, minimize, or cancel, partially or completely, ambient or background radiation. Ambient or background radiation may be electromagnetic radiation emitted from the environment surrounding an object to be thermally imaged, which may produce ambient temperature fluctuations in or across the components of thermal imaging devices (sometimes referred to as an ambient temperature common mode signal). For example, the frame and movable layer may receive ambient radiation that is similar to such radiation received by the substrate, thereby causing each component to move or expand in response to temperature changes imparted into the components from the radiation. Connections and/or connecting structures may be provided between the various components, as described in the present disclosure, configured to isolate, either thermally or mechanically, the components so as to permit the frame to be at least partially isolated or independent from movement in the substrate due to temperature changes in or across the substrate (sometimes referred to herein as "floating"). Similarly, the signal element may be partially isolated or independent from movement in the substrate, and configured to experience a temperature change due to incident radiation. As described above, the signal element may include one or more movable layers coupled to one or more beams (sometimes referred to as a "buckling beam," "deformable member," or the like). In various implementations, the beams may be configured to bend or deflect proportional to the temperature difference between the beam and the frame thereby causing the movable layer to move, where the temperature difference is indicative of the radiation received from the object.

As used herein, the term "move" may refer to a displacement over a distance of a component, or may refer to movement of a material composition of the various components (e.g., that substrate, the frame, the beams, etc.) of the devices described herein. For example, each component may be made up of materials having a coefficient of thermal expansion (CTE) that cause each component to expand, contract, shift vertically or horizontally in real space, or be displaced in relation to the various other components due to temperature changes. Accordingly, the term "move" may also be referred to herein as "displace," "deform," "shift," "deflect," "bend," "expand," "contract," or the like.

As used herein, the term "bend" or "bent" generally refers to a subset of movement types, as described above. For example, to bend may refer to thermal expansion of a component that causes a first end of the component to move relative to the second end (e.g., a straight component may become a curved component) in response to temperature changes in the component. Accordingly, the term "bend" or "bent" may also be referred to herein as "buckle," "deform," "deflect," or the like.

Overview of Example Thermal Imaging Device for Detecting Radiation

Figure 9:
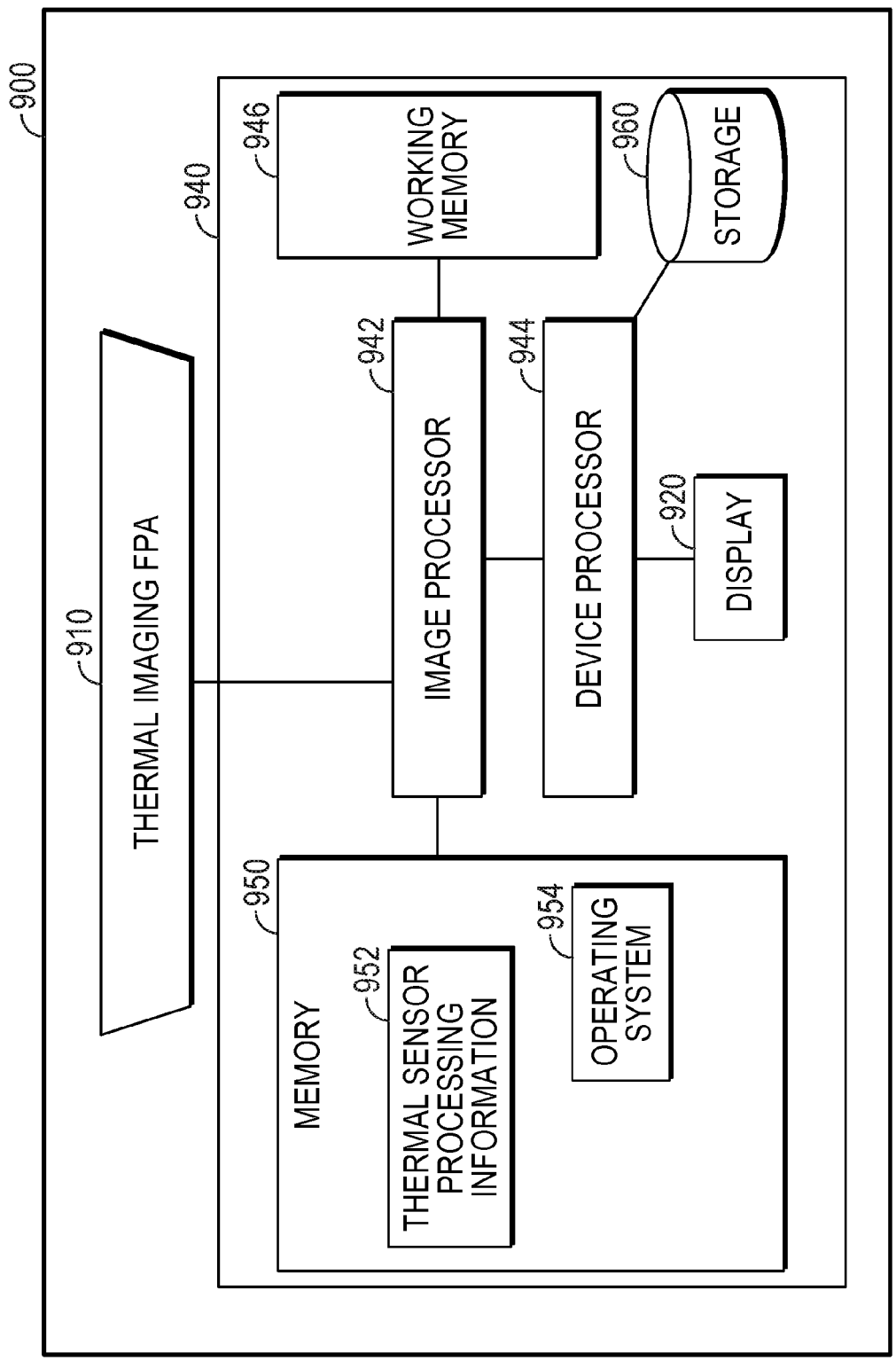
FIG. 9 is a block diagram illustrating an example of a thermal imaging device that includes an FPA in accordance with the various embodiment of the present description.

FIG. 1 is a schematic block diagram of an embodiment of a thermal imaging device 100 that includes a focal plan array (FPA) 110. In some embodiments, the thermal imaging device 100 may include an optical element 120 configured to focus radiation 155 emitted from an object 150 onto the FPA 110. The FPA 110 may be configured to detect the radiation 155 focused thereon and provide an output or signal based on the detected radiation (e.g., indicative of a change in temperature due to the radiation 155). The FPA 110 may be operatively coupled to a sensing circuit 140 configured to receive the output from the FPA 110, or other components of the FPA 110, and generate a signal indicative of the response of the FPA 110. In some embodiments, an optional illumination system 130 may be included configured to illuminate a component of the FPA 110 to provide light that is used in part to generate the signal, as described with reference to FIGS. 4A and 4B. In some embodiments, the thermal imaging device 100 may include an image processor, for example, as illustrated in FIG. 9, operatively coupled to at least one of the FPA 110 or the sensing circuit 140. The image processor may include components used to manipulate, process, or save signals and data received based on the sensing radiation to perform various operations.

In various embodiments, FPA 110 may be a thermomechanical IR FPA implemented as an infrared detector. The FPA 110 may comprise a plurality of sensors 115 (which also may be referred to as pixels) disposed in an array arrangement and positioned at the focal plane of the optical element 120. The plurality of sensors 115 may be configured to detect radiation 155 focused thereon and provide an output based on the detected radiation. In some embodiments, the plurality of sensors 115 may be configured to detect a change in temperature indicative of the detected radiation in accordance with the present disclosure. The sensors 115 may have a structure and operation as described herein with reference to the various figures and examples described throughout the present disclosure. In various embodiments, the plurality of sensors 115 may be configured to detect thermal radiation, for example, radiation from the object 150 having a wavelength in the IR spectrum which may be capable of imparting a temperature change to the various components of the FPA 110 as described herein. For example, the plurality of sensors 115 may include one or more movable layers that are independently movable in response to a temperature change, and the sensors 115 may be configured to produce a signal responsive to the position of the each of the movable layers. In other embodiments, the FPA 110 may be configured to detect radiation of any wavelength spectrum based on a temperature change due to said radiation. While FIG. 1 illustrates an FPA 110 comprising a number of sensors 115, the number of sensors 115 depicted in FIG. 1 is intended for illustrative purposes only and is not intended to be limiting. In various embodiments, any number of sensors 115 may be included in the FPA 110, and the resolution of the resulting radiation detection may be based on the number of sensors 115.

Referring again to FIG. 1, the object 150 may emit radiation 155 (for example, thermal radiation) which may be received, detected, and processed by the various components of the thermal imaging device 100 such that thermal imaging device 100 may capture an image indicative of the emitted radiation. For example, radiation 155 emitted from the object 150 may be incident on the optical element 120. The optical element 120 may be a lens or system of lenses capable of manipulating and focusing radiation in the IR spectrum. The optical element 120 may be configured to focus the radiation 155 onto the FPA 110 or onto one or more of the sensors 115. The sensors 115 may be configured to generate an output based on the temperature change in the sensors 115 due to the radiation detected at each sensor 115, which may be based on the temperature change in the object 150. For example, the sensor 115 may include a signal element comprising one or more movable layers configured to move in response to a temperature change. The sensor 115 may be configured to output a signal that is responsive to the position of the movable layers and indicative of the radiation 155 emitted by the object 150.

Figure 4A:
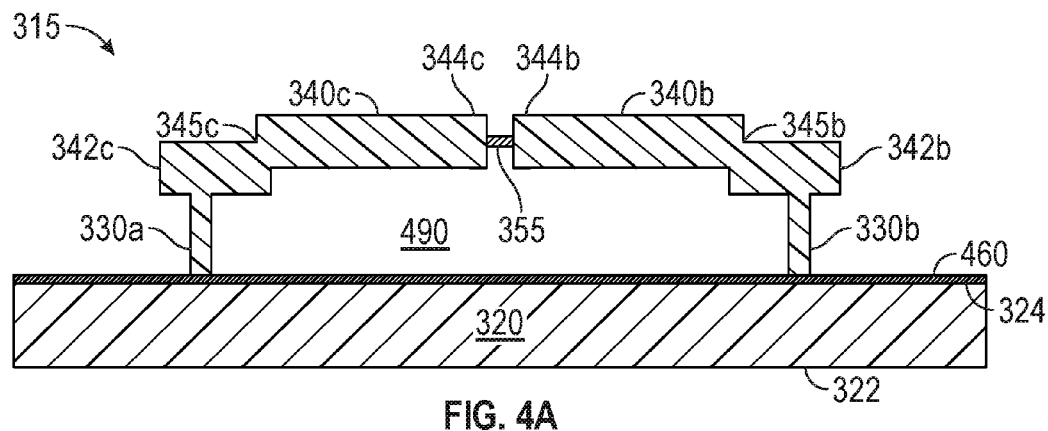
FIGS. 4A and 4B schematically illustrate cross-sectional views of the sensor of FIGS. 3A-3C including an example sensing element.
Figure 4B:
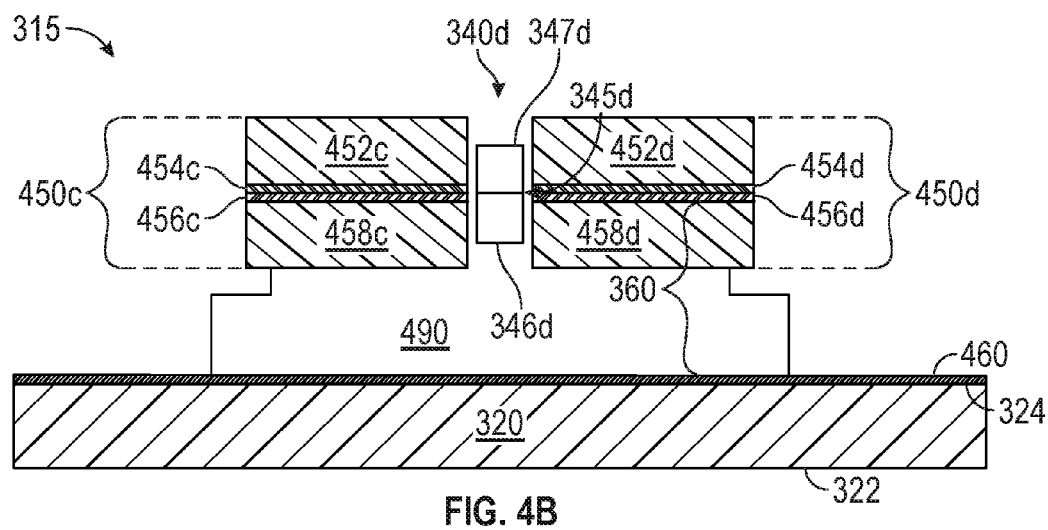
Figure 5:
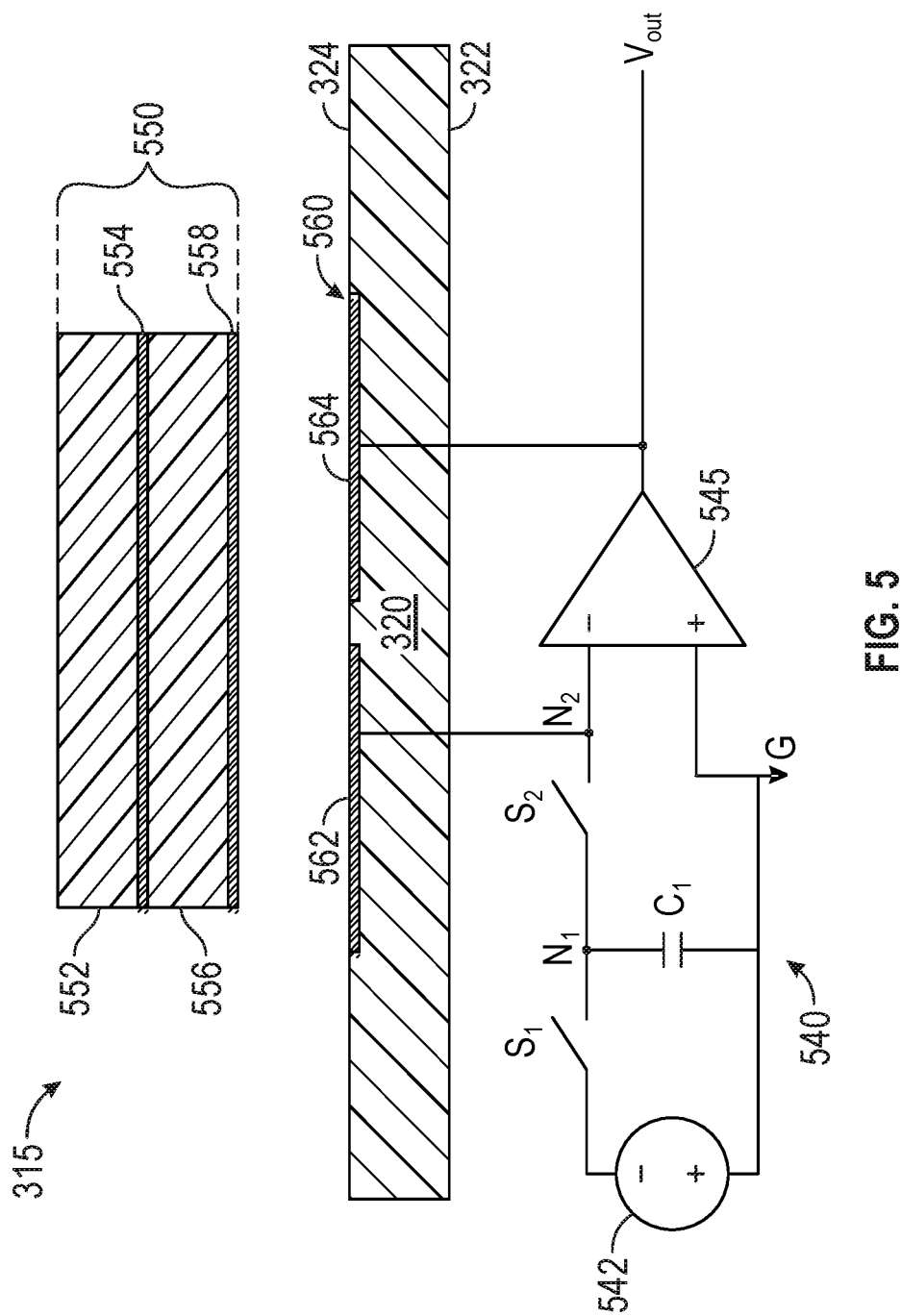
FIG. 5 schematically illustrates a cross-sectional view of the sensor of FIGS. 3A-3C including another example sensing element and sensing circuit.

In various embodiments, the sensing circuit 140 may be configured to generate an output indicative of the response of each of the sensors 115 due to the radiation from object 150. For example, incident radiation or changes in temperature from the object 150 may be read directly via an optical readout, as schematically illustrated in FIGS. 4A & 4B. In this implementation, the sensors 115 may individually output an optical signal indicative of the temperature changes by being in optical communication with the optional illumination system 130. The sensors 115 may be configured to output an optically viewable thermal image to the sensing circuit 140. The sensing circuit 140 may be implemented as a camera (e.g., a monochromatic camera, or the like) configured to capture and display the optical output from sensors 115 of the FPA 110 as an image indicative of the temperature change across the object 150. In another example, the sensing circuit 140 may be implemented as an electrical circuit (e.g., as shown in FIG. 5) operatively coupled to the one or more sensors 115 and configured to output a voltage difference based on the response of each sensor 115. In both embodiments, the thermal imaging device 100 may comprise a memory component or circuit (e.g., as part of the image processor) or be in wired or wireless communication with a remote memory component so as to store the images or electrical signals generated by sensing circuit 140. Therefore, in some embodiments, the sensors 115, optional illumination system 130, and the sensing circuit 140, either individually or in combination, may be at least one sensing means.

Overview of an Example FPA

FIG. 2 schematically illustrates an example of an FPA 210, according to some embodiments. The FPA 210 may be substantially similar to the FPA 110 in some embodiments, and may be implemented in the thermal imaging device 100 described with reference to FIG. 1. As schematically illustrated in FIG. 2, FPA 210 may include a substrate 220 and a plurality of sensors 215. While FIG. 2 illustrates a single sensor 215, this is for illustrative purposes only and not intended to limit the scope of the present disclosure. It will be understood that any number of sensors 215 may be included in FPA 210. In some embodiments, the resolution of the resulting radiation detection may be based on the number of sensors 215 (e.g., the more sensors 215 used, the greater the resolution of the measured radiation).

In the illustrated embodiment, the substrate 220 has a first and second side 222 and 224, respectively. In some embodiments, one or both sides may be planar. As illustrated in FIG. 2, the second side 224 may be positioned such that radiation (e.g., radiation 155 of FIG. 1) is incident thereon and/or is proximate to the object 150, while the first side 222 is positioned between the second side 224 and output direction 226, the second side 222 being distal to the object 150 (the relative orientations being in the context of the illustrated and described figures). In some embodiments, the sensing circuit 140 of FIG. 1 may be disposed or positioned along the first side 222. In some embodiments, the substrate 220 comprises a material composition configured to be transparent to visible radiation or light (e.g., a glass, polymer, or other transparent flexible material).

As schematically illustrated in FIG. 2, the sensor 215 may be disposed on the second side 224. A plurality of sensors 215 may be disposed on the second side 224, which may be arranged in an array or grid-like pattern, as described above, and may operate in a substantially similar manner as described in connection with sensor 115, except as described in the following description with reference to FIG. 2. The sensor 215 comprises a frame 230 attached to the substrate 220, and one or more beams 240 attached to the frame 230. In some embodiments, the frame 230 may be connected to substrate 220 by a plurality of connecting structures 201 while the frame 230 may be connected to the beam 240 by a connector 205. In some embodiments, the beam 240 may be part of a signal element comprising the beam 240 attached to at least one movable layers (not shown).

In some embodiments, the frame 230 comprises a material composition configured to permit thermal expansion along the body of the frame 230, and the connecting structures 201 may be a flexible connecting structures or connection means (e.g., a hinge, a pin-type connector, or the like) configured to at least partially isolate the substrate 220 from the frame 230 (e.g., at least partially mechanically isolate the frame 230 from the substrate 220). For example, radiation may be incident on the frame 230 and the substrate 220, thereby causing the components to either expand or contract based on their corresponding CTE. The connecting structures 201 may be configured to allow the frame 230 to move, away from or towards the substrate 220 based on the thermal expansion of the frame 230. In some embodiments, the frame may move in a direction substantially perpendicular to the substrate 220. At least in part due to the connecting structures 201, the frame 230 may be at least partially isolated from movement in the substrate 220. Thus, the movement of frame 230 may be partially or fully independent of movement in the substrate 220. Therefore, in some embodiments, the connecting structure 201 may be at least one means partially isolating the frame 230 from the substrate 220. In some implementations, such isolation may be one means for compensating for or minimizing the ambient temperature common mode signal imparted onto the substrate. Therefore, in some embodiments, such isolation of the frame 230 from substrate 220 may represent at least one means for at least partially isolating.

In some embodiments, the material of the frame 230 is selected to have a high CTE corresponding to a high thermal expansion and contraction dependent on incident radiation. For example, a relatively high CTE may be approximately equal to or greater than 20 parts per million per degree Celsius. In some embodiments, the CTE of the material of the frame 230 may be approximately equal to or greater than 50 ppm/° C. In some embodiments, the material composition of frame 230 is selected have a high thermal expansion relative to the substrate 220. In some embodiments, the material composition of frame 230 may include polymers (e.g., SU-8, polyimide, polystyrene, etc.). In other embodiments, either in the alternative or in combination, the material of the frame 230 may have a relatively low thermal conductivity.

In various implementations, the beam 240 is an elongated beam having a length longer than its width. In some embodiments, the beam 240 comprises a material composition configured to permit thermal expansion along the body of the beam 240. The material composition of the beam 240 may be configured to permit the beam 240 to bend in a direction substantially perpendicular to the second side 224 of the substrate 220 in response to temperature changes in or across the beam 240 due to incident radiation. In some embodiments, the beam 240 may be made of a single material configured to permit bending, however, this need not be limiting. In some embodiments, the beam 240 may be configured to bend in response a temperature difference between the beam 240 and the frame. For example, as described above, incident radiation may be received by the frame 230, which moves in response to a temperature change. Similarly, the beam 240 receives the same incident radiation, but is configured to absorb radiation emitted from an object. The absorbed radiation may cause the beam 240 to bend, as illustrated in FIG. 2 as bent beam 245 (illustrated as a dotted line) in response to the temperature change. The beam 240 is configured to bend relative to the frame in an amount that is proportional to the temperature difference between the frame 230 and the beam 240. The distance that beams 240 bends may be indicative of the temperature change across the object. Therefore, the beam 240 may represent at least one example of a bending means.

In some embodiments, beam 240 may be coupled to the frame 230 by a connector 205 configured to isolate the beam 240 from the temperature change in the frame 230. For example, the beam 240 may have a first region 242 and a second region 244; the first region may be coupled to the frame 230 by the connector 205. The connector 205 may be configured to thermally isolate the beam 240 from the frame 230. Incident radiation or a portion thereof may be received by the beam 240 causing the material of the beam 240 to expand or contract based on its corresponding CTE, which causes beam 240 to bend as shown as bent beam 245. The connectors 205 may be configured to allow the beam 240 to bend, away from or towards the frame 230, in a direction substantially perpendicular to the second side 224 of the substrate 220. As the beam 240 bends, a gap 260 may be formed between the second region 244 and the frame 230 or the substrate 220. The gap 260 may be indicative of radiation emitted by an object and based on the temperature difference between the beam 240 and the frame 230. In some embodiments, the connector 205 may be a connection point that is narrow relative to the beam 240 and/or frame 230. In another embodiment, alternatively or in combination, the connector 205 may be made of a material that has a CTE that is low relative to the beam 240 and/or frame 230, for example but not limited to, silicon dioxide and/or polymers.

In some embodiments, the material of the beam 240 is selected to have a high CTE. For example, a relatively high CTE may be approximately equal to or greater than 20 ppm/° C. In some embodiments, the CTE of the material of the beam 240 may be approximately equal to or greater than 50 ppm/° C. In some embodiments, the material composition of beam 240 is selected to be the same as frame 230. In some embodiments, the material composition of beam 240 may include polymers (e.g., SU-8, polyimide, polystyrene, etc.). In some embodiments, the beam 240 may be thin and narrow as compared to the frame 230, which, without subscribing to any particular scientific theory, may produce improved thermal isolation between the frame 230 and beam 240. Accordingly, as the beam 240 experiences a temperature change based on the received radiation, the beam may bend proportionally with the temperature difference with respect to the frame 230 (e.g., the bent beam 245). In other embodiments, either in the alternative or in combination, the material of the beam 240 may have a relatively low thermal conductivity.

Example Embodiment of a FPA Comprising a Plurality of Sensors

Figure 3B:
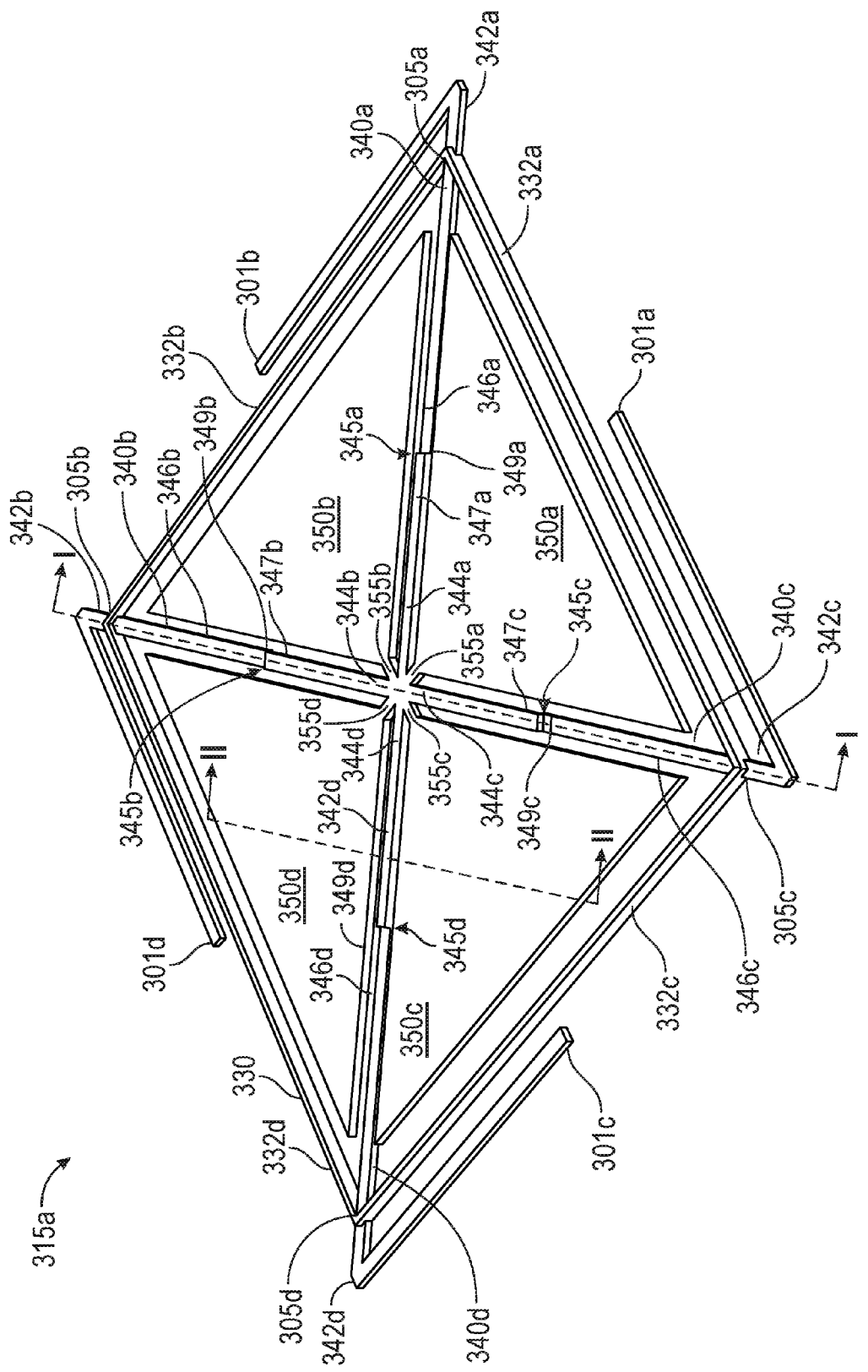
Figure 3C:
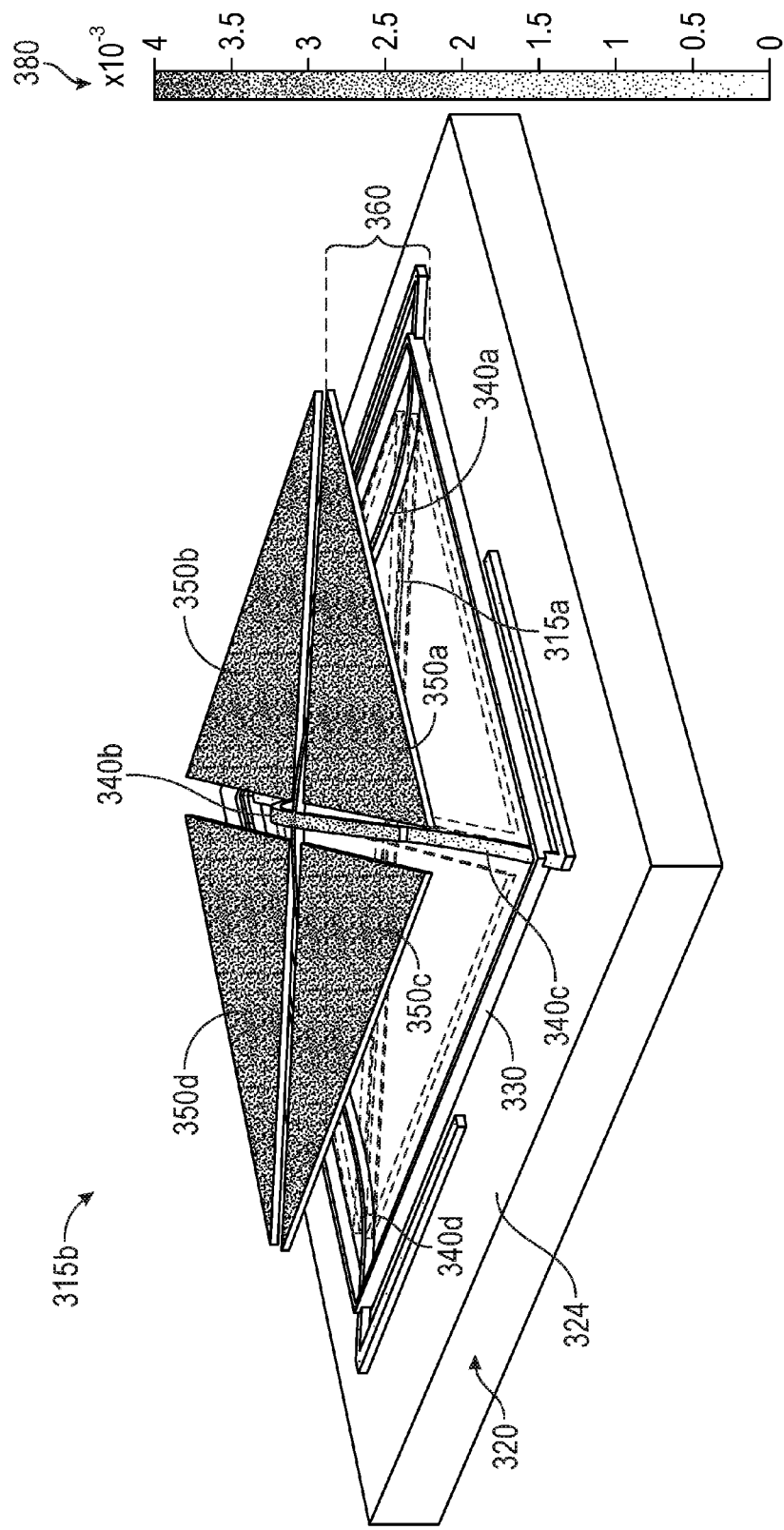

FIGS. 3A-3C illustrate perspective views of a square-shaped configuration of an FPA 310 including a plurality of sensors 315 in accordance with the present disclosure. FIG. 3A illustrates a perspective view of FPA 310 comprising a substrate 320 having a first and second side 322 and 324, respectively, and an array of sensors disposed on the second side 324 in a grid-like pattern. While particular grid-like pattern is illustrated in FIG. 3A, this is not intended to be limiting and other grid patterns are possible. For example, a square grid, a rectangular grid, a honeycomb grid, etc. are possible. FIG. 3B illustrates a perspective view of one sensor 315a of the array of sensors in a first state. FIG. 3C illustrates a perspective view of the sensor 315a of FIG. 3B in a second state.

Sensor 315 may be configured to be substantially similar to the sensors disclosed in the present disclosure (e.g., sensors 115 of FIG. 1 or sensor 215 of FIG. 2), except as provided in reference to FIGS. 3A-3C. For example, the first state illustrated in FIG. 3B may be a zero state, wherein no radiation is incident upon sensor 315. The second state shown in FIG. 3C may be an activated state, wherein sensor 315b receives incident radiation and experiences a temperature change. In some embodiments, sensor 315b in the active state may be configured to generate a signal indicative of an amount of or change in incident radiation based on detecting the radiation emitted from an object. As described above, it should be appreciated that while the following discussion is made with reference to the single sensor 315 of FIGS. 3B and 3C, the same principles and concepts apply to any one or more of the sensors in the array of sensors described throughout the present disclosure.

Returning to FIG. 3B, the sensor 315a may comprise a frame 330 connected to the substrate 320 via connecting structure 301. A plurality of beams 340 may be connected to the frame 330 via connectors 305. A signal element may be included comprising a plurality of sensing elements 350 (illustrated as 350a, 350b, 350c, and 350d). Sensing elements, individually or as a group, may also refer to one or more movable layers as used throughout the present application. The beams 340 may be connected to the sensing elements 350 via connectors 355. In some embodiments, the connectors 355 may be made thinner as compared to the rest of the beams 340. This may, in part, permit most of the bending to occur at the connection point, e.g., connector 355. The sensing elements 350 may be arranged to receive incident radiation (for example, thermal energy), which is transferred through thermal conduction to the beams 340 via the connectors 355. This may cause the beams 340 to bend, as illustrated in FIG. 3C, thereby causing the sensing elements 350 to move through a gap 360. The gap 360 may be indicative of (or correspond to) an amount of radiation emitted from an object being imaged (e.g., radiation 155 from object 150 of FIG. 1). In some embodiments, the sensing elements 350 may be operatively coupled to a sensing circuit (e.g., sensing circuit 140 of FIG. 1) and configured to produce an interferometric modulation (IMOD) effect that may be viewed by the user on the viewing side (e.g., the optical readout of an IR camera), as described in more detail below with reference to FIGS. 4A and 4B. In another embodiment, the sensing element 350 may be operatively coupled to a sensing circuit (e.g., sensing circuit 140 of FIG. 1) and configured to produce an output voltage difference based gap 360, which is described in more detail below with reference to FIG. 5.

In some embodiments, the substrate 320 may be substantially similar to the substrate 220 of FIG. 2. As described above, the substrate 320 may have a first and second side 322 and 324, respectively. In some embodiments, the substrate 320 comprises a material composition configured to be transparent to visible radiation or light (e.g., a glass, polymer, or other transparent flexible material).

As illustrated in FIGS. 3B and 3C, the frame 330 may comprise a plurality of frame elements 332a-332d connected end-to-end that form an enclosing structure (in this example, a square). In some embodiments, the frame elements 332a-332d may be co-planar so as to form a planar two-dimensional enclosed structure. However this need not be limiting to all embodiments and other arrangements are possible. In some embodiments, the frame 330 may be substantially similar to the frame 230 of FIG. 2.

The sensor 315 also comprises the connecting structure 301a-301d. The connecting structure 301a-301d may be substantially similar to the connecting structure 201 of FIG. 2. In some embodiments, the connecting structure 301a-301d may be configured to couple the frame 330 to the second side 324 of the substrate 320. The connecting structure 301a-301d may be configured to allow the frame 330 to move, away from and towards the substrate 320, in a direction substantially perpendicular to the second side 324. In various embodiments, the connecting structure 301a-301d may be configured to at least partially or completely isolate the frame 330 from movement of the substrate 320 caused by changes in temperature of the substrate 320. For example, radiation may be incident on the substrate 320 and the frame 330, resulting in movement and or thermal expansion of the substrate 320 and frame 330. However, thermal expansion of the frame 330 may be mechanically isolated from the thermal expansion of the substrate 320. Accordingly, the frame 330 may be permitted to move, expand, or contract, based on its CTE, freely or independent of the movement in the substrate 32/0. In the embodiment of FIGS. 3A-3C, the region of the frame 330 attached to the substrate 320 via connecting structure 301 may be referred to as an anchor point, e.g., where the sensor 315 is attached to the substrate 320. Therefore, in some embodiments, such isolation of the frame 330 from substrate 320 may represent at least one means for at least partially isolating.

In the embodiment of FIGS. 3B and 3C, the sensor 315 includes the beams 340a-340d (e.g., four beams). However, the number of beams need not be so limited, and may be any number of beams necessary to carry out the various processes and operations disclosed in the present disclosure (e.g., 2, 3, 4, 5, etc.). Each beam 340 comprises a first end 342 and a second end 344, where the first end 342 is coupled to the frame 330 by a connector 305. The connector 305 may be configured to thermally isolate the corresponding beam 340 from the frame 330. As described above in connection with beam 240 of FIG. 2, the beams 340 may comprise a material composition configured to cause the beam 340 to bend in a direction substantially perpendicular to the substrate 320 in response to changes in temperature along the beams 340 based on incident radiation. Therefore, the beam 340 may represent at least one example of a bending means.

In some embodiments, each beam 340 may include a mechanical discontinuity 345 positioned along the length of the corresponding beam 340. In some embodiments, the mechanical discontinuity 345 may be a preferred location for bending the beam 340 in a specific direction. In some embodiments, the mechanical discontinuity may be a step or kink formed within the beam 340. In another embodiment, alternatively or in combination, the mechanical discontinuity may be a change in thickness at a preferred location, either an increase or decrease in thickness as needed to impart the desired bending effect. While FIGS. 3A-3C illustrate a step or kink, it will be understood that any mechanical discontinuity may be used in place of the illustrated step.

The mechanical discontinuity 345 (illustrated as mechanical discontinuity 345a, 345b, 345c, and 345d) may be an asymmetrically positioned along the body of the beam 340. For example, as depicted in FIGS. 3B and 3C, each beam 340 may comprise a first portion 346, a second portion 347, and a discontinuity region 349. The first portion 346 may be positioned on a first plane, in the unbent state, and the second portion 347 may be positioned on a second plane, in the unbent state. The first portion 346 and second portion 347 may be arranged relative to each other such that the first and second planes are shifted (e.g., vertically as shown in FIGS. 3B and 3C) in the discontinuity region 349, as illustrated in FIG. 3B. The mechanical discontinuity 345 may be configured to induce the bending of each beam 340 in a preferred direction based on the arrangement and configuration of the first and second portions 346 and 347, respectively, relative to each other in the discontinuity region 349 (e.g., mechanical discontinuity 345 induces the beams 340 to bend in the direction depicted in FIG. 3C). In some embodiments, where the mechanical discontinuity 345 is not included, the direction of bending may be based on asymmetries in the beams 340 due to manufacturing (e.g., as intended or from imperfections during manufacturing). While an example arrangement of mechanical discontinuity 345 is depicted in FIGS. 3B and 3C, this arrangement should not be limiting, and other arrangements are possible based on the desired bending direction and configuration of sensors 315. Therefore, the mechanical discontinuity 345 (sometimes referred to as an asymmetry) may represent at least one example of a bending means.

In the embodiment of sensor 315 depicted in FIGS. 3B and 3C, the sensor 315 includes a signal element comprising the sensing elements 350a-350d. In some embodiments, the sensing elements 350 may be arranged within the frame 330 and thermally coupled to the second end 344 of one or more beams 340 to thermally conduct heat absorbed by the sensing element to the beams 340. As illustrated in FIGS. 3A and 3B, there may be four triangular sensing elements 350 disposed in a co-planar arrangement. However, this is for illustrative purposes only, and is not intended to be limiting. Any number of sensing elements 350 may be used in accordance with the embodiments herein. In some embodiments, sensing elements 350 may be symmetric so that the temperature across each sensing element, and as thermally conducted to each beam, remains constant or substantially similar at operating temperatures. In some embodiments, the sensing elements 350 may have a thickness and surface area that is large relative to the beam 340 and frame 330. The thickness of the sensing elements 350 may be selected to reduce bending of sensing elements 350 which may, in part, reduce any bi-material effects in the sensing elements 350. In some embodiments, the surface area of sensing elements 350 may be selected to facilitate absorption of an increased, amount of incident radiation, which may be transferred as heat to other components of the sensor 315, as disclosed herein. In some embodiments, sensing elements 350 may operate in resonant or broadband absorption of incident radiation. In some embodiments, the sensing elements 350 may be at least one sensing means.

FIG. 3C illustrates a perspective view of the response of the sensor 315b to a temperature difference of one (1) Kelvin between an object and the surrounding (or "ambient") environment. In this example, the sensor 315b may be part of a thermal imaging camera (e.g., thermal imaging device 100), which may include an infrared (IR) optical element having an f/# of 1-. The sensor 315b is depicted as a square sensor having a length and width dimensions of 100 microns, and the beams each having a thickness of 1 micron. FIG. 3C also depicts a displacement scale 380 depicting an example greyscale color gradient (e.g., from $0.1 \times 10^{-3}$ micrometers in white to greater than $4.2 \times 10^{-3}$ micrometers in darker grey) based on the bend of the beams 340 in response to the temperature difference of 1 Kelvin. As illustrated, the bending of beam 340 causes the sensing elements 350 to be displaced by a substantially similar distance. While FIG. 3C illustrates an example sensor 315b having dimensions as described above, the dimensions are not intended to be limiting, but are provided merely as an illustrative example. Other dimensions are possible, and the various components of sensor 315b may scale in accordance with the size of the sensor 315. For example, while beams 340 are shown having a thickness of 1 micron, it is possible to have beams having a thickness of 0.1 to 2 microns.

FIG. 3C depicts beams 340 bent so as to displace the sensing elements 350 by 4.2 nanometers relative to the frame 330 and substrate 320 in response to the 1 Kelvin temperature difference. For example, the environment produces ambient radiation and the object emits its own radiation. The combined incident radiation may be received by each of the components of the FPA 310, as described herein. The components may then absorb the radiation, causing each component to change temperature based on its corresponding CTE. This temperature change induces thermal expansion and movement in the various components of the FPA 310.

As described above, the frame 330 may be mechanically isolated from the substrate 320 via connecting structure 301, which permits the frame 330, beams 340, and sensing elements 350 to move at least partially independent of the movement in the substrate 320. The various components may move, expand, or contract freely from movement in the substrate due to temperature changes in the substrate 320. Thus, the connecting structure 301 may be one means for minimizing, partially or full cancelling, or partially or fully compensating for thermal expansion in the substrate 320 due to the ambient radiation. In some embodiments, because the frame 330 and beams 340 experience the same ambient radiation, they may move due to said ambient radiation in the same or similar manner depending on their corresponding material composition. The sensing elements 350 may then collect incident radiation and channel the thermal energy into the beams 340 such that the beams 340 bend relative to the frame 330 and/or substrate 320. The bending of the beams 340 may be proportional to the temperature difference between the frame 330 and beams 340. The sensing elements 350 may be displaced based on the bending of the beams, thereby forming the gap 360. The sensing element 350 may be configured to produce an output, based on the gap 360, indicative of the temperature difference between the beams 340 and the frame 330. Accordingly, the gap 360 may be indicative of a temperature difference across the object and an amount of radiation emitted by the object.

Example Sensing Elements Configured to Generate an Optical Output Signal

FIGS. 4A and 4B schematically illustrate cross-sectional views of the embodiment of a sensor 315 of FIGS. 3A-3C. While FIGS. 4A and 4B illustrate the sensor 315 in the first state of FIG. 3B, this is for illustrative purposes only. It will be understood that the description with reference to FIGS. 4A and 4B applies to sensors 315 in a first or second state (e.g., sensor 315a and 315b) as will be evident in the following description. FIGS. 4A and 4B illustrate the sensor 315 including an embodiment of a sensing element 450 showing an approach using interferometric modulator display ("IMOD") techniques as the sensing mechanism for the sensor 315. Sensing element 450, which also can be referred to a part of one or more movable layers, may be substantially similar to sensing elements 350 of FIG. 3 and/or be part of sensing circuit 140 of FIG. 1. As described above, in some embodiments, the sensing elements 450 are configured to move through a portion of gap 360 to produce an optical signal which can be received by a sensing circuit (not shown), for example, sensing circuit 140 of FIG. 1. For example, the sensing circuit may comprise a light sensing element (e.g., an CCD or CMOS image sensor comprising pixels for receiving light) that may detect an optical signal produced by a visible light interaction with the sensing elements 450 and an absorber 460, the optical signal may be indicative of the position of the sensing elements 450. As with all concepts and embodiments in the present disclosure, while FIGS. 4A and 4B illustrate an example sensing mechanism with reference to sensor 315, it should be understood that any feature, structure, step, material, or component that is illustrated and/or described in connection with FIGS. 4A and 4B can be used with or instead of any feature, structure, step, material, or component that is illustrated and/or described in any of the various other embodiments described in the present disclosure. In some embodiments, the sensing elements 450 may be at least one sensing means.

FIG. 4A illustrates the cross-section view of sensor 315 along the line I-I in FIG. 3B. FIG. 4A depicts, referring to FIG. 3, the substrate 320 including the first side 322 and second side 324, and having an absorber 460 disposed on the second side 324. The frame 330 is illustrated as two beams (e.g., 330a and 330c) coupled to the second side 324 of the substrate 320. In some embodiments, the frame 330 may be coupled directly to the substrate 320 or coupled to the substrate 320 with the absorber 460 disposed therebetween. FIG. 4A also illustrates the beams 340b and 340c including corresponding mechanical discontinuities 345b and 345c, which are coupled to the frame 330 by a connector (not shown) at one end 342 of each beam 340. The second end 344 of each beam is attached to the sensing element 350 as illustrated in FIG. 3B, so as to facilitate thermal conduction from the sensing element to the beams 340.

FIG. 4B illustrates the cross-section view of sensor 315 along the line II-II in FIG. 3B. FIG. 4A depicts the substrate 320 including the first side 322 and second side 324, and having an absorber 460 disposed on the second side 324. FIG. 4B also depicts an embodiment of the sensing element 450, which may be substantially similar to the sensing element 315 of FIG. 3A-3C, except as provided in the following description. FIG. 4B shows a portion of sensing elements 450c and 450d positioned on opposite sides of beam 340d, having a first portion 346d and second portion 347d. The various components illustrated in FIGS. 4A and 4B may be connected to the other components as described, illustrated, or provided throughout the present disclosure, for example, as described above with reference to FIGS. 3A-3C.

In some embodiments, the sensor 315 may be manufactured through the use of methods and procedures useful for manufacturing microelectromechanical systems. For example, the various components, elements, wires, electrical connections, layers, and materials described throughout the present disclosure may be deposited (e.g., physical vapor deposition, chemical deposition, etc.), sputtered, patterned, etched, etc. so as to form the components in accordance with the embodiments disclosed here. For example, as illustrated in FIGS. 4A and 4B, a sacrificial layer 490 may be deposited on top of substrate 320 and/or absorber 460 and patterned according to the desired shape and properties of the frame 330, beams 340 and signal elements (e.g., sensing elements 350). Once the various components are deposited and patterned, as illustrated in FIGS. 4A and 4B or as desired in accordance with the various other embodiments, the sacrificial layer 490 is selectively removed (e.g., dissolved based on solubility or etched) without removing or damaging the various other components. The sacrificial layer 490 may be of a material composition to permit the ease of removal without affecting the remaining components of the sensor 315.

In some embodiments, the sensing elements 450 (e.g., 450a and 450c) may comprise a stacked structure as illustrated in FIG. 4B. For example, each sensing element 450 may comprise a first layer 452, an absorber layer 454 adjacent to the first layer 452, a reflective layer 456 adjacent to the absorber layer 454 such that the absorber layer 454 is positioned between the reflective layer 456 and the first layer 452, and a second layer 458 adjacent to the reflective layer 456.

In some embodiments, the absorber layer 454 may be positioned so as to receive radiation, while the reflective layer 456 maybe configured to reflect visible radiation in a direction toward the substrate 320 to facilitate an optical readout of the detected IR radiation via an IMOD effect. The reflective layer 456 may be may be positioned on a readout side (e.g., readout side 226 of FIG. 2). The absorber layer 454 may also be configured to absorb incident radiation and to thermally conduct heat to the beams 340 via the connectors 355. The transfer of heat may induce a temperature change across the beams 340 thereby causing the beams 340 to bend and cause the sensor 315 to be in an active state (e.g., sensor 315b of FIG. 3c). As described above with reference to FIG. 3C, as the beams 340 bend, the sensing elements 450 may be moved through at least a portion of the gap 360. The gap 360 may be configured to operate as an interferometric cavity (e.g., similar to a Fabry-Perot interferometer). Accordingly, in the active state, the reflective layer 456 may be configured to reflect light toward absorber 460 having a color dependent on the gap 360. Thus, as gap 360 changes based on the amount that sensing element 450 is displaced due to bending of the beam 340, a different color output is reflected by the sensing element 450 and received by absorber 460. The absorber 460 may be considered part of the sensing element 450 or part of a sensing circuit (e.g., sensing circuit 140 of FIG. 1). Accordingly, the gap 360, based on the reflected light, may be indicative of an amount of radiation emitted from an object. In some embodiments, the sensing element 450 may be considered a means for generating a signal of the response of the sensor 315 to a detected radiation.

In some embodiments, the reflected light may be received at the reflective layer 456 from a light source (not shown). In some embodiments, the light source may emit light in the visible, infrared, or any spectral range. In some embodiments, the light source may be the surrounding environment or a front lighting system (e.g., optional illumination system 130 of FIG. 1) configured to emit light onto the reflective layer 456.

In some embodiments, the absorber 460 may be configured to absorb visible light reflected by the reflective layer 456. In some embodiments, the absorber 460 may be made of a material comprising molybdenum, a chrome alloy, vanadium, etc. The material may be selected so as to absorb the light (visible or otherwise) reflected from the reflective layer 456. While the absorber 460 is described as absorbing visible light, this need not be limiting and absorber 460 may be configured to absorb radiation of any spectral bandwidth range. For example, in some situations the reflective layer 456 may reflect any spectral bandwidth (e.g., IR, UV, etc.) and the absorber may be configured to absorb such reflected light.

In some embodiments, the first and second layers 452 and 458 may comprise a material composition of a polymer, which may be the same or different for each of the first and second layers 452 and 458. The material of the first layer 452 may be selected to be transmissive to IR radiation, and the material of the second layer 458 may be selected to be transmissive to visible radiation. In some embodiments, the absorber layer 454 may be an IR radiation absorbing layer, and may comprise a material composition of at least one of a carbon and nitride materials configured to absorb incident IR radiation. In some embodiments, the absorber layer 454 may be made of carbon. In another embodiment, alternatively or in combination, the absorber layer 454 may be a silicon nitride. Other materials are possible. The reflective layer 456 may be at least partially transmissive to visible light and partially reflective to visible light. In another embodiment, the reflective layer 456 may be substantially reflectively to visible light. In some embodiments, the reflective layer 456 may comprise a material composition including a reflective metal. For example, but not limited to, aluminum, gold, or silver metals may be used as for the reflective layer 456. In some embodiments, the sensing elements 450 may be mechanically symmetric to remain flat at operating temperatures. The absorber layer 454 may be configured to operate in resonant or broadband absorption. The sensing elements 450 may have a surface area that is larger than the beams 340 and frame 330, thereby absorbing a larger amount of incident radiation that may then be transferred as heat to other components of the sensor 315. In various embodiments, as described above, the various layers of the sensing element 450 may have a thickness selected to minimize bending of the absorber layer 454 and reflective layer 456 due to thermal expansion or other external effects. Without subscribing to any particular scientific theory, it is believed that by selecting an appropriate thickness for one or more of the layers of the sensing element 450, the bimetallic bending effects may be reduced and improve accuracy and consistency of the sensor 315.

In one implementation, the various layers of the sensing element 450 may have thickness between 2 nanometers and 1000 nanometers. For example, the absorber layer 454 may have a thickness between 50 nanometers and 1000 nanometers. The reflective layer 456 may have a thickness between 50 nanometers and 1000 nanometers. The absorber 460 may have a thickness between 2 nanometers and 20 nanometers. While specific examples are provided herein, these are not intended to be limiting, and any thickness may be applicable.

While FIG. 4B illustrates one example stacked structure, it will be understood that other arrangements are possible. For example, the absorber layer 454 may be disposed such that the first layer 452 is adjacent to and between the absorber layer 454 and the reflective layer 456. In another embodiment, the second layer 458 may not be necessary. In yet another embodiment, the reflective layer 456 may be disposed within or between one or more of the other layers, such that reflective layer 456 is positioned between the absorber layer 454 and the substrate 320.

In some embodiments, the sensing elements 450 may be operatively coupled to a sensing circuit (not shown) disposed on the first side 322 of the substrate 320 (e.g., sensing circuit 140 of FIG. 1). The sensing circuit may be configured to receive an output from the sensing elements 450 indicative of the IMOD effect, and generate a signal indicative of the response of each sensor 315. In some embodiments, the sensing circuit may be configured to store the signals to a memory component. In another embodiment, alternatively or in combination, the sensing circuit may be a camera (e.g., a multiple color camera or a monochromatic camera) configured to receive the IMOD effect and display an image representing the change in temperature across an object based on received IR radiation.

One non-limiting advantage of the FPA 310 comprising a plurality of sensors 315 including the sensing elements 450 as described herein, is that the FPA 310 may provide improved thermal isolation amongst the components of a thermal imaging camera, because the need for electrical connections to detect resistive differences (e.g., as in conventional bolometers) to measure incident radiation is removed. For example, the sensing elements 450 are configured to provide a direct optical readout indicative of the incident radiation emitted from an object. However, in some embodiments, an electrical circuit based sensing element may be possible through utilizing capacitive sensing, as shown in FIG. 5.

Example Sensing Elements Configured to Generate an Electrical Output Signal

FIG. 5 schematically illustrates a cross-sectional view of the embodiment of sensor 315 of FIGS. 3A-3C taken along the line II-II, including another embodiment of a sensing element 350 and sensing circuit 540. FIG. 5 may be similar to FIG. 4B, except that FIG. 5 illustrates the sensor 315, including sensing elements 550, and sensing circuit 540 and showing an approach using capacitive position sensing as the sensing mechanism for each sensor 315. In some embodiments, the sensing elements 550 may be at least one sensing means. As with all concepts and embodiments in the present disclosure, while FIG. 5 illustrates an example sensing mechanism with reference to sensor 315, it should be understood that any feature, structure, step, material, or component that is illustrated and/or described in connection with FIG. 5 can be used with or instead of any feature, structure, step, material, or component that is illustrated and/or described in any of the various other embodiments described in the present disclosure.

In the embodiment illustrated in FIG. 5, the sensing element 550 may comprise a stacked structure. While a single sensing element 550 may be schematically depicted in FIG. 5, it will be understood that a plurality of sensing elements 550 may be implemented with similar configuration (e.g., the plurality of sensing elements 350 of FIGS. 3A-3C). The sensing element 550 may be substantially similar to the sensing element 450 of FIGS. 4A and 4B, except for as provided herein in connection with FIG. 5. Each sensing element 550 may comprise a first layer 552, an absorber layer 554 adjacent to the first layer 552, a second layer 556 adjacent to the absorber layer 554 such that the absorber layer 554 is positioned between the second layer 556 and the first layer 552, and a conductive layer 558 adjacent to the second layer 556. The material of the first layer 552 may be selected to be transmissive to IR radiation. In some embodiments, the material of the first or second layer 552 and 556, respectively, may be a polymer. The first and second layers 552 and 556 may be the same material but this need not be the case. In some embodiments, the absorber layer 554 may be substantially similar to the absorber layer 454 of FIG. 4B. The conductive layer 558 may be configured to function as an equipotential surface, with a charge induced by a first conductor portion 562 and second conductor portion 564 of the sensing circuit 540. In some embodiments, the conductive layer 558 may comprise a material composition including a metal, for example but not limited to, aluminum, silver, gold, copper, etc.

While FIG. 5 illustrates one example stacked structure, it will be understood that other arrangements are possible. For example, the absorber layer 554 may be disposed such that the first layer 552 is adjacent to and between the absorber layer 554 and the conductive layer 558. In another embodiment, the second layer 556 may not be necessary. In yet another embodiment, the conductive layer 558 may be disposed within or between one or more of the other layers, such that conductive layer 558 is positioned between the absorber layer 554 and the substrate 320. In some embodiments, conductive layer 558 may be adjacent to absorber layer 554. In another embodiment, the absorber layer 554 may comprise a conductive material such that the absorber layer 554 may function as an equipotential surface, in such an embodiment, the conductive layer 558 need not be included.

In some embodiments, the sensing elements 550 may be implemented in sensor 315 as schematically illustrated in FIG. 4A. However, the absorber 460 may be replaced with a conductor 560 disposed on the second side 324 of the substrate 320 In some embodiments, the conductor 560 may comprise two physically separate portions, first conductor portion 562 and second conductor portion 564, having a space therebetween. The first and second conductor portions 562 and 564 may be electrically connected to each other as part of or via sensing circuit 540 and configured as a sensing mechanism for the sensor 315 employing capacitive position sensing. The sensing circuit 540 may be configured to transfer a known charge to the sensor 315, via first conductor portion 562 and/or second conductor portion 564 in electrical communication with conductive layer 558, and detect a resulting voltage difference across the conductors (e.g., based on the gap 360 of FIG. 3C). As such, the conductor 560 and conductive layer 558 may be configured to operate as a capacitor for capacitive position sensing, wherein the voltage difference across the capacitor may be related to the distance between the conductor 560 and the conductive layer 558. Accordingly, the resulting voltage difference may be based on the distance between the conductors 560 and conductive layer 558 and may be indicative of an amount of incident radiation.

In one embodiment, the sensing circuit 540 includes at least one source 542, connected to a switch $S_1$ at the positive terminal of source 542, which may be connected to a first node $N_1$, and ground G at the negative terminal of source 542. A capacitor $C_1$ may be connected to the node $N_1$ and a switch $S_2$. The switch $S_2$ may be connected to a node $N_2$ so as to be connected to a negative terminal of an amplifier 545 and to the first conductor portion 562, as illustrated in FIG.

5. The positive terminal of amplifier 545 may be connected to ground while the output of the amplifier may be connected to the second conductor portion 564 and configured to provide a voltage output $V_{out}$. In operation, the switch $S_1$ may be closed to charge the capacitor $C_1$ based on a known voltage from source 542. The switch $S_1$ may be opened and the switch $S_2$ is then closed, thereby transferring the charge to the capacitor comprising the conductor 560 and conductive layer 558 to charge sensor 315. The resulting voltage difference is then measured as $V_{out}$. In some embodiments, the voltage difference may be indicative of the amount of radiation incident on the sensor 315. In some embodiments, the voltage difference may be indicative of the radiation emitted by an object, where the ambient common mode signal has been reduced in accordance with the present description.

Example Embodiment of Another FPA Comprising a Plurality of Sensors

Figure 6A:
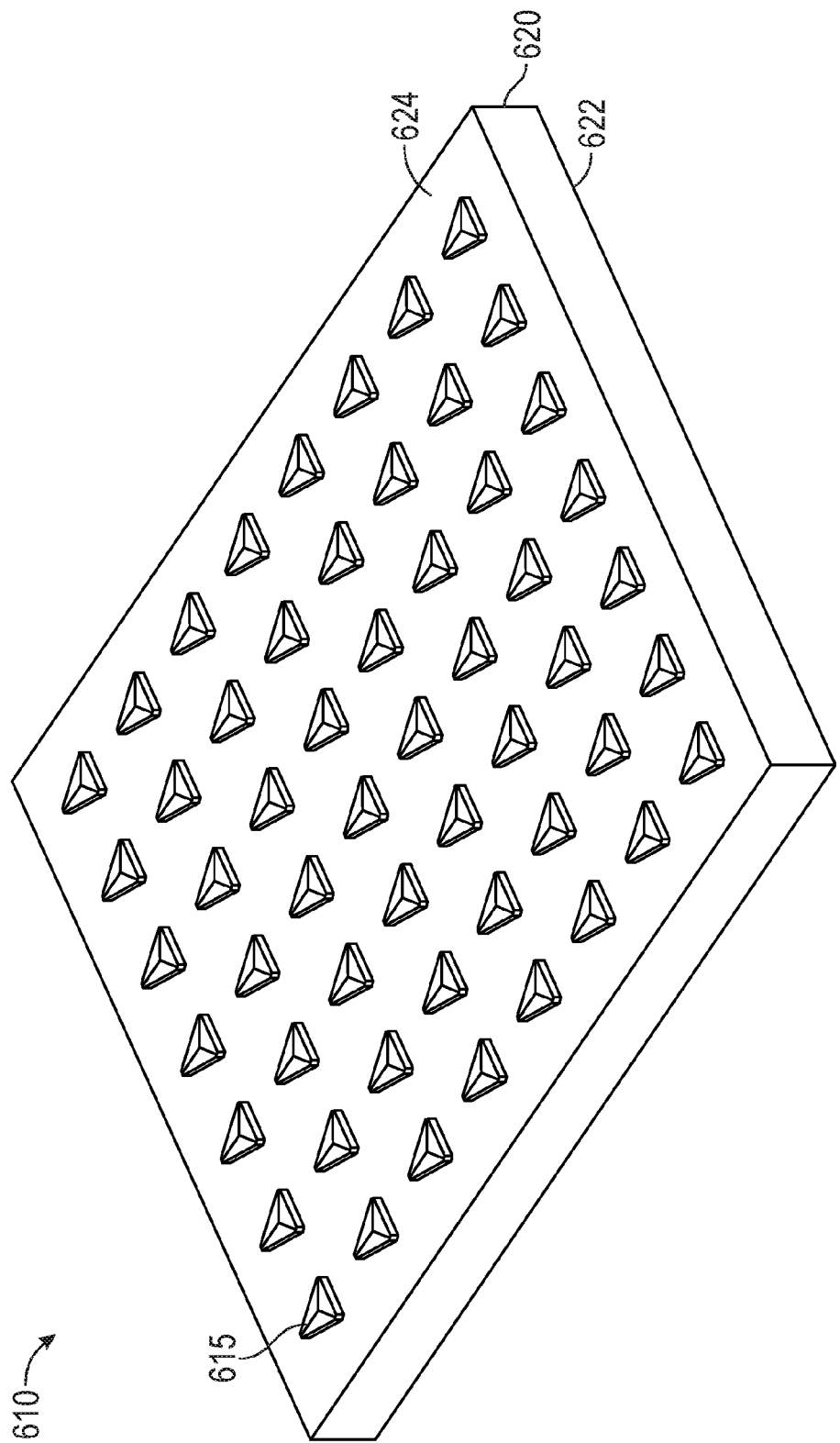
FIGS. 6A-6C illustrates perspective views of another example FPA comprising a plurality of sensors in accordance with another embodiment.
Figure 6B:
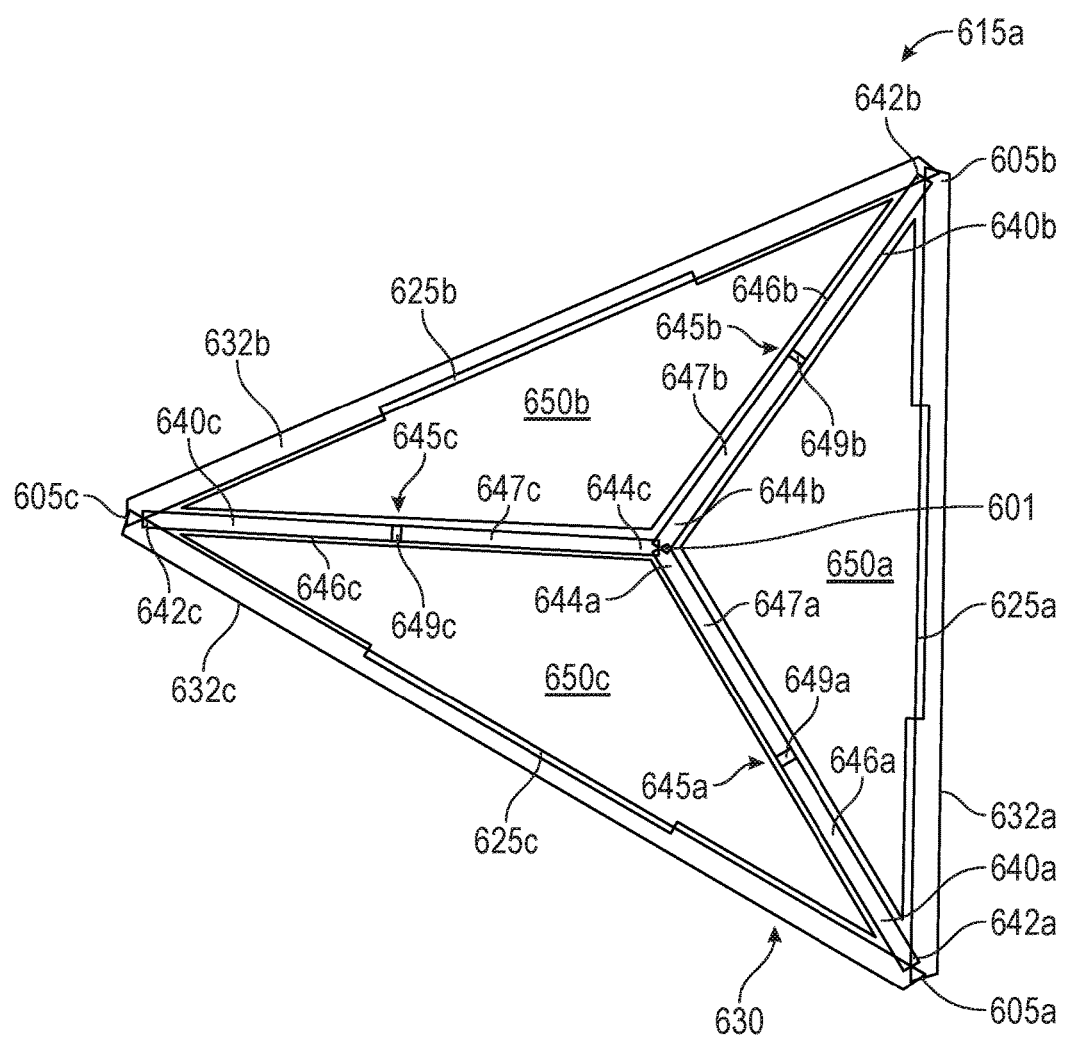
Figure 6C:
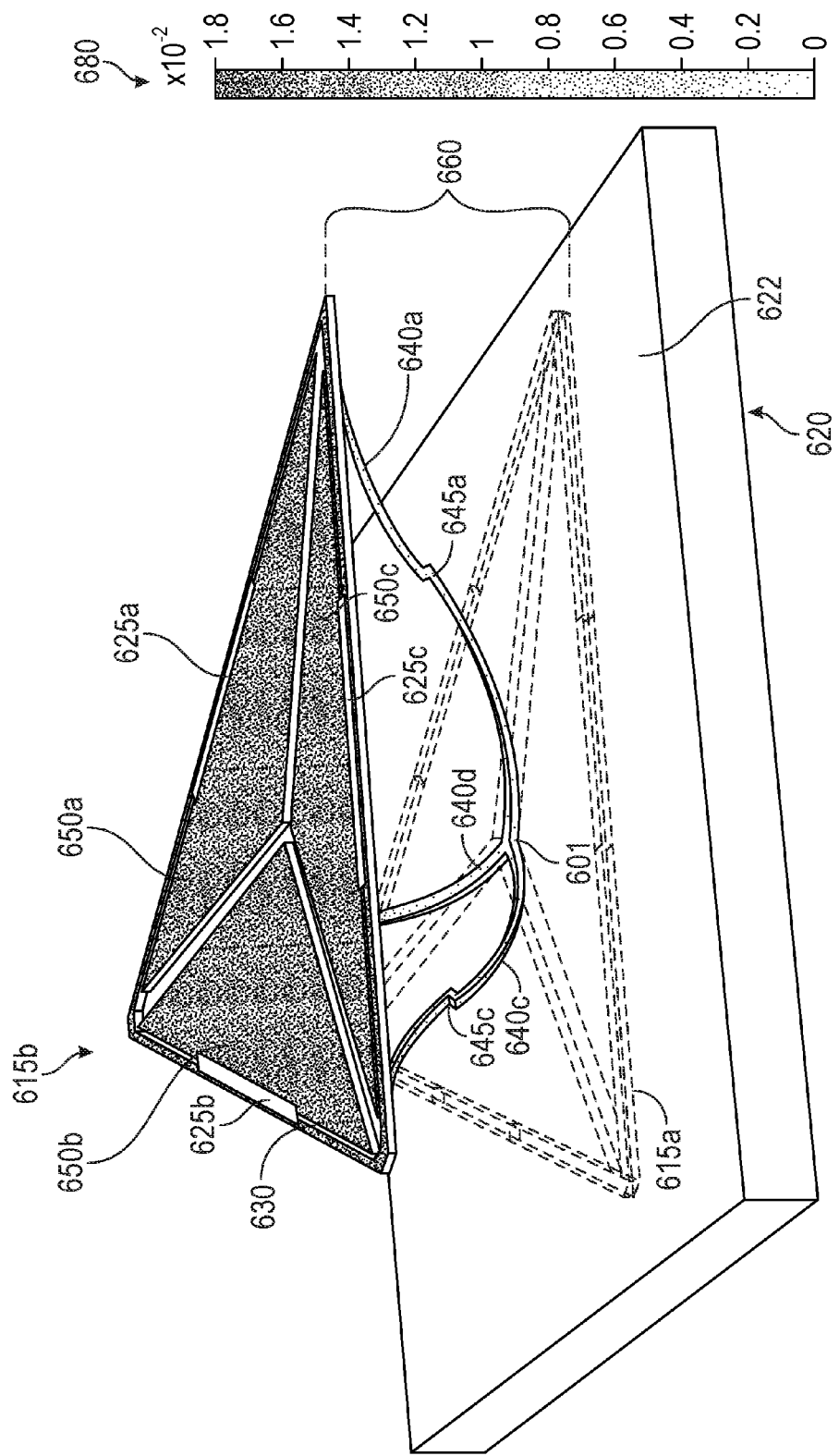

FIGS. 6A-6C illustrate perspective views of embodiment triangle-shaped configuration of an FPA 610 including a plurality of sensors 615 in accordance with the present disclosure. FIG. 6A illustrates a perspective view of FPA 610, that is substantially similar to the FPA 310 of FIG. 3, comprising a substrate 620 having a first and second side 622 and 624, respectively, and an array of sensors disposed on the second side 624 in a grid-like pattern. Sensor 615 is configured to be substantially similar to the sensors disclosed in the present disclosure (e.g., sensors 115 of FIG. 1 or sensor 215 of FIG. 2), except as provided in reference to FIGS. 6A-6C. As described above, it should be appreciated that while the following discussion is made with reference to the single sensor 615 of FIGS. 6B and 6C, the same principles and concepts apply to any one or more of the sensors in the array of sensors described throughout the present disclosure. FIG. 6B illustrates a perspective view of one sensor 615a of the array of sensors in a first state. FIG. 6C illustrates a perspective view of the sensor 615a of FIG. 6B in a second state. The first and second states of FIGS. 6B and 6C, respectively, may be similar to the first and second states of FIGS. 3B and 3C. Accordingly, the description in connection with FIGS. 3B and 3C may be applied to the embodiments illustrated in FIGS. 6B and 6C, except as provided in reference to FIGS. 6A-6C.

Referring to FIG. 6B, the sensor 615a may comprise a plurality of beams 640 connected to the substrate 620 via connecting structure 601 (also referred to herein as an anchor point). The plurality of beams 640 may be connected to the frame 630 via connectors 605. A signal element may be included comprising a plurality of sensing elements 650. The frame 630 may be connected to the sensing elements 650 via connectors 625. The sensing elements 650 may be configured to receive incident radiation, which may be transferred through thermal conduction to the frame 630 via the connectors 625. This may cause the frame 630 to move in response to the transfer of heat due to incident radiation. The plurality of beams 640 may also experience a change in temperature due to incident radiation thereby causing the beams 640 to bend, as illustrated in FIG. 6C, thereby causing the sensing elements 650 to move through a gap 660. The gap 660 may be indicative of an amount of radiation emitted from an object being imaged (for example, radiation 155 from object 150 of FIG. 1).

The sensing elements 650 may be substantially similar to the sensing elements 350, except as provided in reference to FIGS. 6A-6C. Accordingly, in some embodiments, the sensing elements 650 may be operatively coupled to a sensing circuit (e.g., sensing circuit 140 of FIG. 1) and configured to produce an interferometric modulation (IMOD) effect that may be viewed by the user on the viewing side (e.g., the optical readout of an IR camera), as described in more detail above with reference to FIGS. 4A and 4B. In another embodiment, the sensing element 650 may be operatively coupled to a sensing circuit (e.g., sensing circuit 140 of FIG. 1) and configured to produce an output voltage difference based gap 660, as described in more detail above with reference to FIG. 5.

As illustrated in FIGS. 6B and 6C, the frame 630 may comprise a plurality of frame elements 632a-632c connected end-to-end that form an enclosing structure (in this example, a triangle). In some embodiments, the frame elements 632a-632c may be co-planar so as to form a planar two-dimensional enclosed structure. However this need not be limiting to all embodiments and other arrangements are possible. In some embodiments, the frame 630 may be substantially similar to the frame 230 of FIG. 2.

In the embodiment of FIGS. 6B and 6C, the sensor 615 includes three beams 640a-640d that may be substantially similar to beams 340 of FIG. 3, except as provided with reference to FIGS. 6A-6C. The number of beams need not be limited to three, and may be any number of beams necessary to carry out the various processes and operations disclosed in the present disclosure (e.g., 2, 3, 4, 5, etc.). Each beam 640 comprises a first end 642 and a second end 644, where the first end 642 is coupled to the frame 630 by a connector 605. The connector 605 may be configured to thermally isolate the corresponding beam 640 from the frame 630. As illustrated in the embodiment of FIGS. 6B and 6C, the second end 644 of each beam 640 may be coupled to the second side 624 of the substrate 620 via one or more connecting structure 601. As described above in connection with FIG. 2, the beams 640 may comprise a material composition configured to cause the beam 640 to bend in a direction substantially perpendicular to the substrate 620 in response to changes in temperature along the beams 640 based on incident radiation. Therefore, the beam 640 may represent at least one example of a bending means.

In some embodiments, each beam 640 may include a mechanical discontinuity 645 positioned along the length of the corresponding beam 640. The mechanical discontinuity 645 may be substantially similar to mechanical discontinuity 345 of FIGS. 3A-3C. For example, as depicted in FIGS. 6B and 6C, each beam 640 may comprise a first portion 646 and a second portion 647. The first portion 646 may be positioned on a first plane, in the unbent state, and the second portion 647 may be positioned on a second plane, in the unbent state. The first portion 646 and second portion 647 may be arranged relative to each other such that the first and second planes are shifted (e.g., vertically as shown in FIGS. 6B and 6C), as illustrated in FIG. 6B. The mechanical discontinuity 645 may be configured to induce the bending of each beam 640 in a preferred direction based on the arrangement and configuration of the first and second portions 646 and 647, respectively. While an example arrangement of mechanical discontinuity 645 is depicted in FIGS. 6B and 6C, this arrangement should not be limiting, and other arrangements are possible based on the desired bending direction and configuration of sensors 615. Therefore, the mechanical discontinuity 645 may (sometimes referred to as a discontinuity, kink, or discontinuity region) represent at least one example of a bending means.

In some embodiments, the connecting structure 601 may be substantially similar to the connecting structure 601 of FIG. 3, except there is a single connecting structure 601 coupled to the beams 640. The connecting structure 601 may be configured to allow the beams 640 to bend, as illustrated in FIG. 6C, so as to move the frame 630, away from and towards the substrate 620, in a direction substantially perpendicular to the second side 624. In various embodiments, the connecting structure 601 may be configured to at least partially or completely isolate the beams 340, and the frame 630, from movement of the substrate 620 caused by changes in temperature of the substrate 620 in a manner substantially similar as described above with reference to FIGS. 3B and 3C.

For example, radiation may be incident on the substrate 620 and the frame 630, resulting in movement and or thermal expansion of the substrate 620 and frame 630. However, thermal expansion of the frame 630 may be isolated from the thermal expansion of the substrate 620 via connection structure 301. Accordingly, the frame 630 may be permitted to move, expand, or contract, based on its CTE, freely or independent of the movement in the substrate 620. In the embodiment of FIGS. 6A-6C, the region of the frame 630 attached to the substrate 620 via connecting structure 601 may be referred to as an anchor point, e.g., where the sensor 615 is attached to the substrate 620. Accordingly, as illustrated in FIGS. 6B and 6C, the anchor point(s) of the sensors 615 to the substrate 620 can be anywhere on sensor 615 and be any number of anchor point(s) (e.g., one illustrated in FIGS. 6A and 6B or four as illustrated in FIGS. 3B and 3C). Therefore, in some embodiments, such isolation of the frame 630 from substrate 620 may represent at least one means for at least partially isolating.

In the embodiment of sensor 615 depicted in FIGS. 6A and 6B, the sensor 615 includes a signal element comprising the sensing elements 650a-650c (also referred to as one or more movable elements). Signal element and sensing elements 650 may be substantially similar to the signal element and sensing elements 350 of FIGS. 3A-3C. In some embodiments, the sensing elements 650 may be arranged within the frame 630 and thermally coupled to the at least one of the beams 632 of frame 630 to thermally conduct heat absorbed by the sensing element to the frame 630. As illustrated in FIGS. 6B and 6C, there may be three triangular sensing elements 650 disposed in a co-planar arrangement. However, this is for illustrative purposes only, and is not intended to be limiting. Any number of sensing elements 650 may be used in accordance with the embodiments herein. In some embodiments, the sensing elements 650 may be at least one sensing means.

FIG. 6C illustrates a perspective view of the response of the sensor 615b to a temperature difference of 1 Kelvin between an object and the surrounding environment. In this example, the sensor 615b may be part of a thermal imaging camera (e.g., thermal imaging device 100), which may include an IR optical element having an f/# of 1. The sensor 615b is depicted as a triangle sensor having a pixel dimension (e.g., equal to the pixel area if the pixel was a square) of 150 microns, and the beams each having a thickness of 1 micron. FIG. 6C also depicts a displacement scale 680 depicting an example greyscale color gradient (e.g., from $1.4 \times 10^{-2}$ microns in white to greater than $1.8 \times 10^{-2}$ microns in darker grey) based on the bend of the beams 640 in response to the temperature difference of 1 Kelvin. As illustrated, the bending of beam 640 causes the sensing elements 650 to be displaced by a substantially similar distance. While FIG. 6C illustrates an example sensor 615b having dimensions as described above, the dimensions are not intended to be limiting, but are provided merely as an illustrative example. Other dimensions are possible, and the various components of sensor 615b may scale in accordance with the size of the sensor 615. For example, while beams 640 are shown having a thickness of 1 micron, it is possible to have beams having a thickness of 0.1 or 0.2 microns.

FIG. 6C depicts beams 640 bent so as to displace of the sensing elements 650 by 18.7 nanometers relative to the frame 630 and substrate 620 in response to the 1 Kelvin temperature difference. For example, the environment produces ambient radiation and the object emits its own radiation. The combined incident radiation maybe received by each of the components of the FPA 610, as described herein. The components may then absorb the radiation, causing each component to change temperature based on its corresponding CTE. This temperature change induces thermal expansion and movement in the various components of the FPA 610. One non-limiting advantage of the sensor 615 is that by having fewer connectors 605, better thermal isolation may be achieved between the frame 630 and beams 640, thus, without subscribing to any particular scientific theory, the sensor 615 may have improved sensitivity.

As described above, the beams 640 may be mechanically isolated from the substrate 620 via connecting structure 601, which permits the frame 630, beams 640, and sensing elements 650 to move at least partially independent of the movement in the substrate 620. The various components may move, expand, or contract freely from movement in the substrate due to temperature changes in the substrate 620. Thus, the connecting structure 601 may be one means for minimizing, partially or full cancelling, or partially or fully compensating for thermal expansion in the substrate 620 due to the ambient radiation. In some embodiments, because the frame 630 and beams 640 experience the same ambient radiation, they may move due to said ambient radiation in the same or similar manner depending on their corresponding material composition. The sensing elements 650 may then collect incident radiation and channel the thermal energy into the frame 630 and the beams 640 may bend relative to the frame 630 and/or substrate 620 due to incident radiation. The bending of the beams 640 may be proportional to the temperature difference between the frame 630 and beams 640. The sensing elements 650 may be displaced based on the bending of the beams, thereby forming the gap 660. The sensing element 650 may be configured to produce an output, based on the gap 660, indicative of the temperature difference between the beams 640 and the frame 630. Accordingly, the gap 660 may be indicative of a temperature difference across the object and an amount of radiation emitted by the object.

Overview of Another Example FPA

Figure 7:
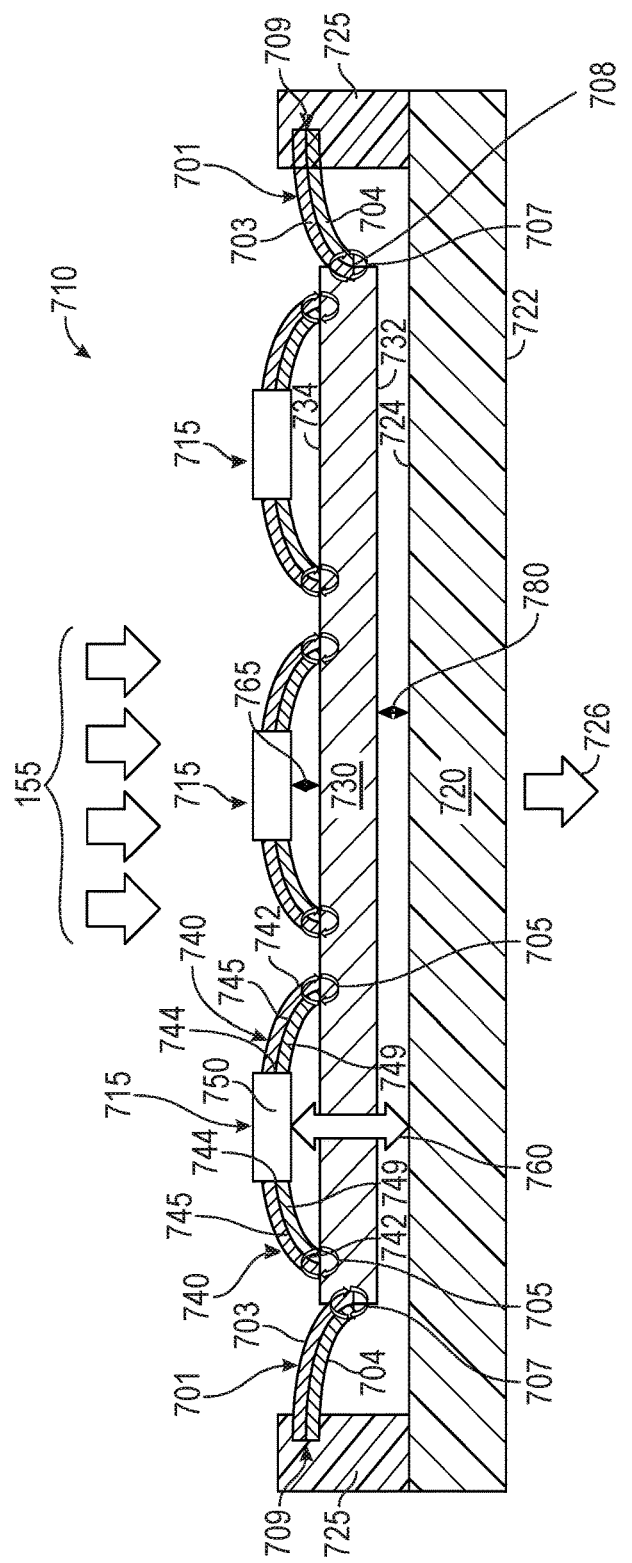
FIG. 7 schematically illustrates a cross-sectional view of certain example aspects of another embodiment of an FPA in accordance with some embodiments.

FIG. 7 schematically illustrates an embodiment of an FPA 710. In some embodiments, the FPA 710 may be similar to the FPA 110 and may be implemented in the thermal imaging device 100 described with reference to FIG. 1. As schematically illustrated FPA 710 may comprise a substrate 720, a frame 730, and a plurality of sensors 715. While FIG. 7 illustrates three sensors 715, this is for illustrative purposes only and not intended to limit the scope of the present disclosure. It will be understood that any number of sensors 715 may be included in FPA 710. Similarly, while FIG. 7 illustrates a single frame 730 comprising a plurality of sensors 715 thereon that make up the entirety of the sensor, this is for illustrative purposes only and not intended to limit the scope. It will be understood that any number of frames 730 may be included in FPA 710, such that each frame comprises a plurality of sensors 715. In some embodiments, the resolution of the resulting radiation detection may be based on the number of sensors 715 (e.g., the more sensors 715 used, the greater the resolution of the measured radiation).

In some embodiments, the substrate 720 may have a first and second side 722 and 724, respectively. In some embodiments, one or both sides may be planar. As illustrated in FIG. 7, the second side 724 may be positioned such that radiation (e.g., radiation 155 of FIG. 1) is incident thereon while the first side 722 is positioned between the second side 724 and output direction 726. In some embodiments, the sensing circuit 140 of FIG. 1 may be disposed or positioned along the first side 722. In some embodiments, the substrate 720 comprises a material composition configured to be transparent to visible radiation or light (e.g., a glass, polymer, or other transparent flexible material).

As schematically illustrated in FIG. 7, the frame 730 having a first side 734 and a second side 732 may be disposed on the second side 724 of substrate 720. The first side 734 may be positioned adjacent to the second side 724 of substrate 720 having a gap 780 therebetween. The frame 730 may be coupled to the second side 724 of the substrate 720 via one or more first beams 701. The frame 730 may be configured to move through at least a portion of the gap 780 via the first beams 701. In some embodiments, the sensing circuit 140 of FIG. 1 may be disposed or positioned along the first side 732 of frame 730 instead of on the substrate 720. In some embodiments the frame 730 comprises a material composition configured to be transparent to visible radiation or light (e.g., a glass, polymer, or other transparent flexible material).

In some embodiments, the one or more first beams 701 may have a first end 709 connected to a connection region 725 of the substrate 720 and a second end 708 coupled to the frame 730 by a connector 707. In some embodiments, the connector 707 comprises a flexible, rotatable, or otherwise movable connection type (e.g., a pin-type connection that permits movement within the connection). In some embodiments, the first end 709 is connected to the connection region 725 by a fixed connection (e.g., a fixed type connection). The first beam 701 may be a connection means (e.g., a hinge, a bi-morph hinge, or the like) configured to at least partially isolate the frame 730, and sensors 715 thereon, from the substrate 720 (e.g., at least partially mechanically isolate the frame 730 from the substrate 720). For example, radiation may be incident on the frame 730 and the substrate 720, thereby causing the components to either expand or contract based on their corresponding CTE. The first beams 701 may be configured to allow the frame 730 to move through the gap 780, away from or towards the substrate 720 based on the thermal expansion of the frame 730 and/or first beams 701. At least in part due to the first beams 701, the frame 730 may be configured to counteract or minimize movement with respect to the substrate 720 due to ambient temperature (e.g., the common mode ambient temperature changes). Therefore, in some embodiments, the first beam 701 may be at least one means partially isolating the sensors 715 from the substrate 720. In some embodiments, isolation of the frame 730 from substrate 720 may represent at least one means for at least partially isolating the sensors 715 from the common mode ambient temperature change.

In some embodiments, the first beam 701 may include two (or more) materials, referred to as a bi-material composition, which is configured to permit thermal expansion along the body of the first beam 701, which causes the first beam 701 to bend. For example, a hinge may include two materials, each of the materials having a different coefficient of thermal expansion which cause it to bend when the material changes temperature (e.g., a bi-morph hinge). In some embodiments, the first beam 701 comprises multiple materials selected to have high thermal mismatch. For example, first beam 701 may comprise a first material 703 and a second material 704 having different material composition so as to induce bending in response to a temperature change based on the difference in their respective CTEs. In some embodiments, the first and second material 703 and 704, respectively, may be selected to be one of a metal and oxide, a metal and polymer, or an oxide and a polymer. In some embodiments, using an oxide and a polymer may provide a high thermal mismatch while also providing low thermal conduction between the materials. It will be understood that material 703 or 704 may be a metal, oxide, or polymer as needed to provide the desired direction of the bend in the first beam 701. Example materials, not intended to be limiting, may include silicon dioxide, aluminum, and polymers such as SU-8, polyimide, polystyrene, etc. In some embodiments, the first and second material 703 and 704 may be arranged in a planar stacked arrangement (e.g., layered with a first material 703 stacked on top of the second material 704) or a corrugated arrangement. Other arrangements are possible, such that the high thermal mismatch between the first and second material causes a bend in the beam 701 when exposed to a temperature change.

In some embodiments, the first beam 701 may be thin and narrow as compared to the frame 730 and sensor 715, which, without subscribing to any particular scientific theory, may produce improved thermal isolation between the frame 730 and substrate 720. Accordingly, as the first beam 701 experiences a temperature change based on the received radiation, the first beam 701 may bend proportionally with the temperature difference with respect to the frame 730 and substrate 720. In other embodiments, either in the alternative or in combination, the material of the beam 701 may have a relatively low thermal conductivity (e.g., polymers and/or oxides in some embodiments).

In some embodiments, the material composition of the first beams 701 may be configured to permit the first beams 701 to bend in a direction substantially perpendicular to the second side 724 of the substrate 720 in response to temperature changes in or across the first beam 701 due to incident radiation. For example, as described above, incident radiation may be received by the first beam 701 causing a temperature change in the first beam 701, which may cause the beam 701 to bend based on the thermal mismatch of material 703 and 704 in response to the temperature change. The first beams 701 may be configured to bend relative to the substrate 720 in an amount that is proportional to, and counteracts or minimizes the, common mode ambient temperature changes. Therefore, the first beams 701 may represent at least one example of a bending means.

In some embodiments, a plurality of sensors 715 may be disposed on the second side 732 of frame 730 having a gap 760 between the sensors 715 and second side 724 of substrate 720 and a gap 765 between the sensors 715 and the second side 734 of the frame 730. The plurality of sensors 715 may be arranged in an array or grid-like pattern, as described above and may operate in a substantially similar manner as described in connection with sensor 115, except as described in the following description with reference to FIG. 7. The sensors 715 in this embodiment may be considered a signal element and may comprise a one or more movable layers 750 attached to the frame 730 by one or more second beams 740. In some embodiments, the sensors 715 may be configured to provide a signal based on sensing received incident radiation, the signal being proportional to the radiation emitted from an object.

In some embodiments, the second beams 740 comprise a first end 742 connected to the frame 730 via a connector 705 and a second end 744 connected to the sensor 715. In some embodiments, the connector 705 is flexible, rotatable, or otherwise movable connection type (e.g., a pin-type connection that permits movement within the connection). In some embodiments, the second end 744 is connected to the sensor 715 by a fixed connection (e.g., a fixed type connection). The second beams 740 may be a connection means (e.g., a hinge, a bimorph hinge, or the like) configured to move or deflect the sensors 715 in response to a temperature change in second beams 740. For example, radiation may be incident on the second beams 740 and the sensor 715, thereby causing the components to either expand or contract based on their corresponding CTE. The second beams 740 may be configured to allow the sensor 715 to move through gap 765, away from or towards the frame 730 based on the thermal expansion of the sensor 715 and/or second beams 740. The gap 765 may be indicative of an amount of radiation emitted from an object being imaged (e.g., radiation 155 from object 150 of FIG. 1). As described above, the frame 730 also moves through gap 780 to counteract common mode ambient temperature changes by, for example, moving in a direction opposite to the movement of the sensors 715. Accordingly, the gap 760 is configured to remain substantially constant due to the first beams 701 counteracting the common mode ambient temperature in a first direction through gap 780 while the second beams 740 move the sensors 715 in a second direction through gap 765.

In some embodiments, the sensor 715 may be operatively coupled to a sensing circuit (e.g., sensing circuit 140 of FIG. 1) and configured to produce an interferometric modulation (IMOD) effect, based on the gap 760, that may be viewed by the user on the viewing side (e.g., the optical readout of an IR camera), as described in more detail above with reference to FIGS. 4A and 4B. In another embodiment, the sensors 715 may be operatively coupled to a sensing circuit (e.g., sensing circuit 140 of FIG. 1) and configured to produce an output voltage difference based gap 760, as described in more detail above with reference to FIG. 5.

In some embodiments, the second beams 740 are similar to the first beams 701. In some embodiments, the second beams 740 may comprise a bi-material composition (e.g., a bi-morph hinge) configured to permit thermal expansion along the body of the second beams 740, which causes the second beams 740 to bend. In some embodiments, the second beam 740 comprises multiple materials selected to have high thermal mismatch, as described above with reference to the first beam 701. In some embodiments, the second beam 740 may comprise the same materials as the first beam 701. However, this need not be the case, and a first material 745 and second material 749 of second beam 740 may be different than that of the first beam 701. In some embodiments, the second beam 740 may be thin and narrow as compared to the frame 730 and sensor 715, which, without subscribing to any particular scientific theory, may produce improved thermal isolation between the frame 730 and sensor 715. Accordingly, as the second beam 740 experiences a temperature change based on the received radiation, the beam may bend proportionally with the temperature difference with respect to the frame 730 and sensor 715. In other embodiments, either in the alternative or in combination, the material of the second beam 740 may have a relatively low thermal conductivity (e.g., polymers and/or oxides in some embodiments).

In some embodiments, the material composition of the second beams 740 may be configured to permit the second beam 740 to bend in a direction substantially perpendicular to the second side 724 of the substrate 720 in response to temperature changes in or across the second beam 740 due to incident radiation. For example, as described above, incident radiation may be received by the second beams 740 causing a temperature change in the second beams 740, which may cause the second beam 740 to bend based on the thermal mismatch of material 745 and 749 in response to the temperature change. The second beam 740 may be configured to bend relative to the frame 730 in an amount that is proportional to the temperature difference between the frame 730 and the second beam 740. The distance that second beams 740 bends may be indicative of the temperature change across the object. Therefore, the second beam 740 may represent at least one example of a bending means.

In some embodiments, the connector 705 may be configured to isolate the second beam 740 from the temperature change in the frame 730. For example, the beam 740 may have a first end 742 and a second end 744; the first end 742 may be coupled to the frame 730 by the connector 705 and the second end may be coupled to the sensor 715. The second beam 740 may be configured to thermally isolate the sensor 715 from the frame 730. In some embodiments, a relatively high thermal isolation between the sensor 715 and frame 730 may generate temperature variations across the array of sensors 715 for thermal images that are produced. Incident radiation or a portion thereof may be received by the second beams 740 causing the material of the second beam 740 to expand or contract based on its corresponding CTE, which causes second beam 740 to bend. The connectors 705 may be configured to allow the second beam 740 to bend, away from or towards the frame 730, in a direction substantially perpendicular to the second side 724 of the substrate 720. As the beam 740 bends, the gap 765 and gap 760 may be formed between sensor 715 and the frame 730 and the substrate 720, respectively. The gap 765 or 760 may be indicative of radiation emitted by an object and based on the temperature difference between the beam 740 and the frame 730. In some embodiments, gap 760 is indicative of radiation emitted by an object after compensating for the common mode temperature.

Example Embodiment of Another FPA Comprising a Plurality of Sensors

Figure 8A:
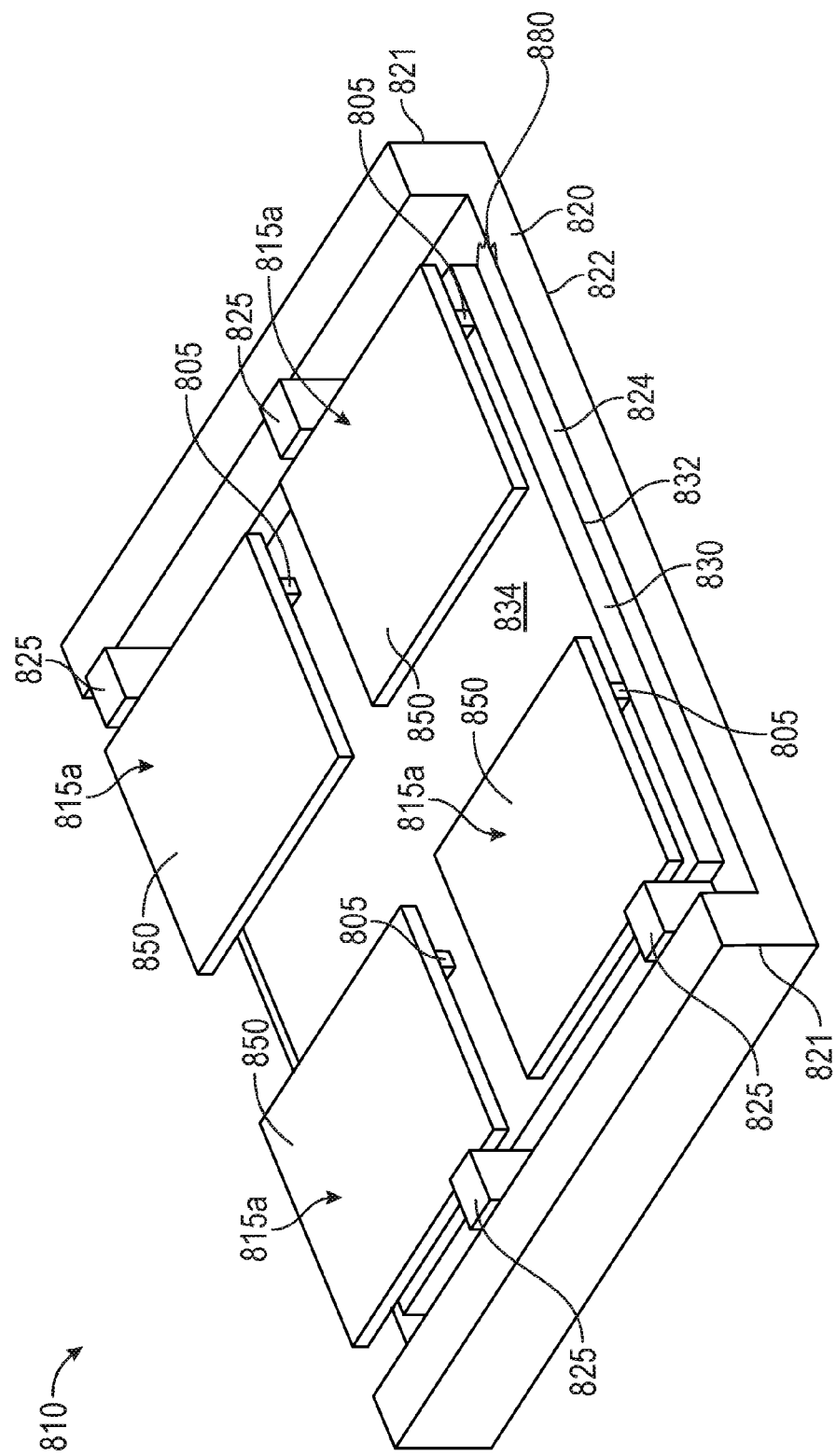
FIGS. 8A-8D illustrates perspective views of another example FPA comprising a plurality of sensors in accordance with another embodiment.

FIGS. 8A-8D illustrate perspective views of some embodiments of an FPA 810 including a plurality of sensors 815 in accordance with the present disclosure. For clarity of illustration, some fabrication aspects and structure of the illustrated embodiments may not be portrayed in the figures. FIG. 8A illustrates a perspective view of FPA 810 comprising a substrate 820 having a first and second side 822 and 824, respectively, a frame 830 (having a first and second side 832 and 834) attached to the second side 824 of the substrate 820 at connection region 825 (which may be referred to as anchor points), and an array of sensors 815 comprising one or more movable layers 850 disposed on the second side 834 of frame 830 in a grid-like pattern. In this arrangement, the thermal radiation may be incident on the second side 824 of substrate 820 such that the thermal radiation is received by the sensor 815. In another embodiment, not illustrated, the substrate 820 may be attached to the second side 834 of frame 830 at connection regions 825, such that the sensors 815 are disposed between the first side 822 of the substrate 820 and the second side 834 of the frame 830. In this arrangement, the thermal radiation may be incident on the first side 832 of frame 830. The frame 830 may be made of a material that is transparent to thermal radiation or frame 830 may include one or more opening to permit thermal radiation to pass onto the sensors 815. While this embodiment is not illustrated, the operating principles are substantially similar to those described above in connection to FIG. 7 and below in connection with the embodiment illustrated in FIGS. 8A-8D.

Figure 8B:
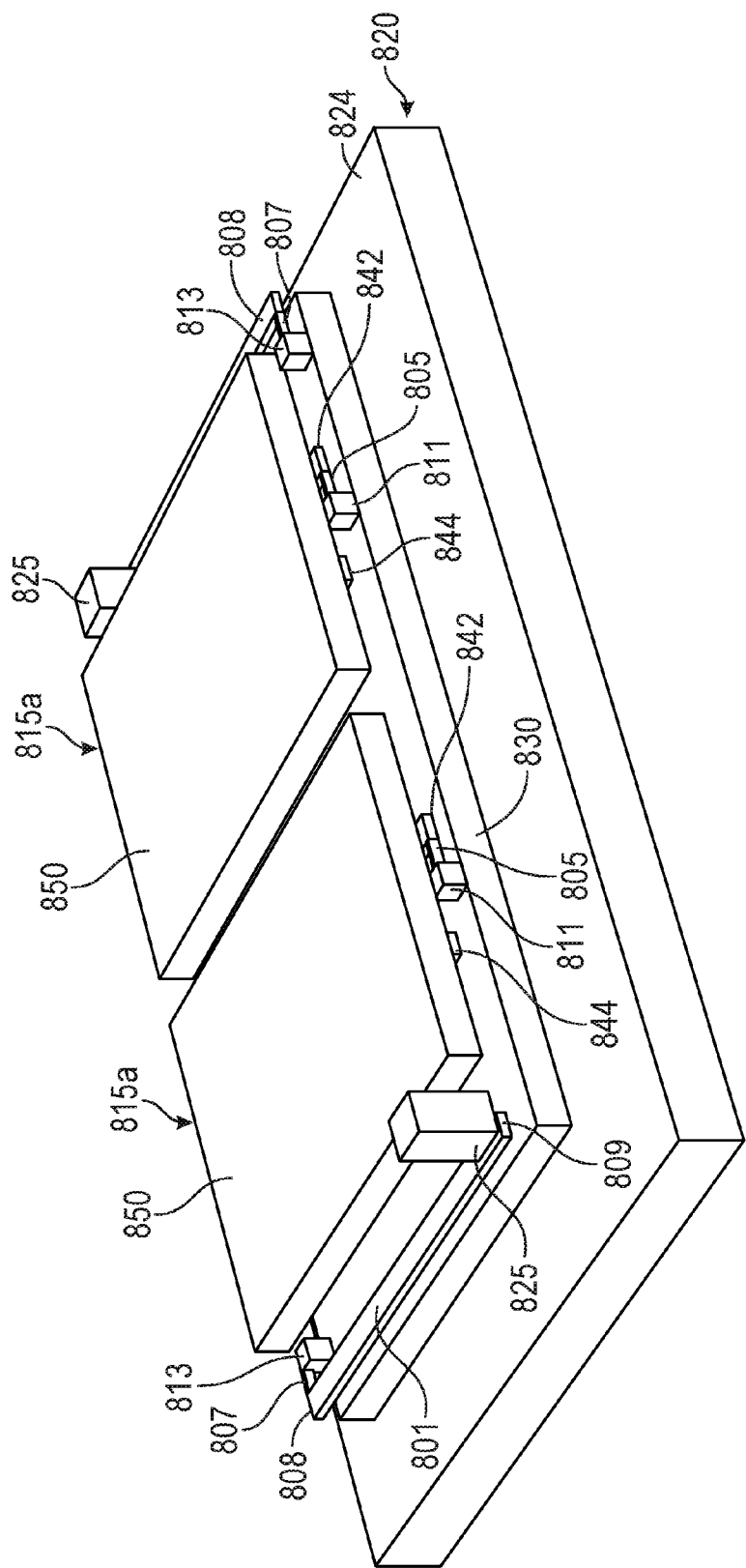
Figure 8C:
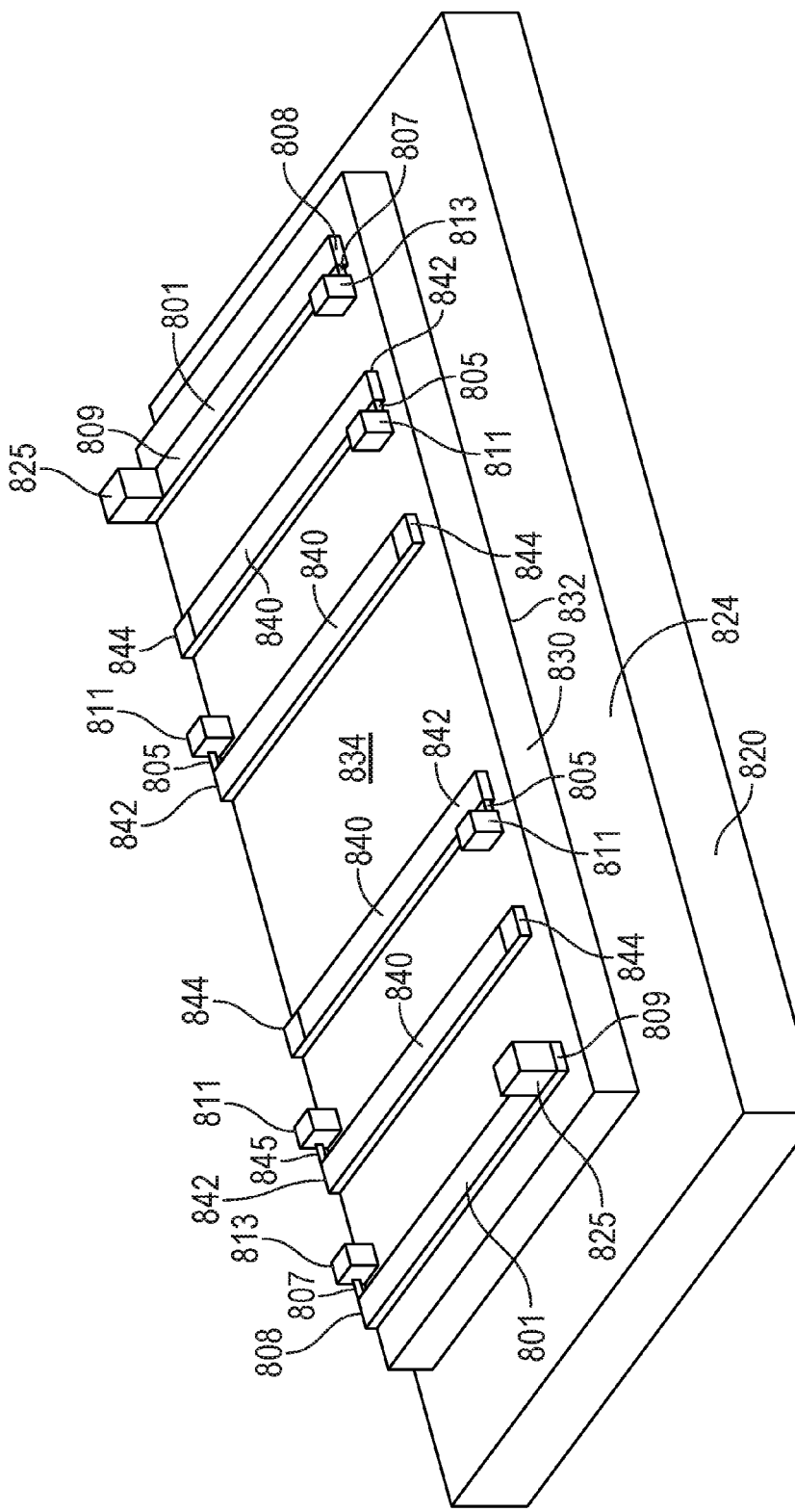
Figure 8D:
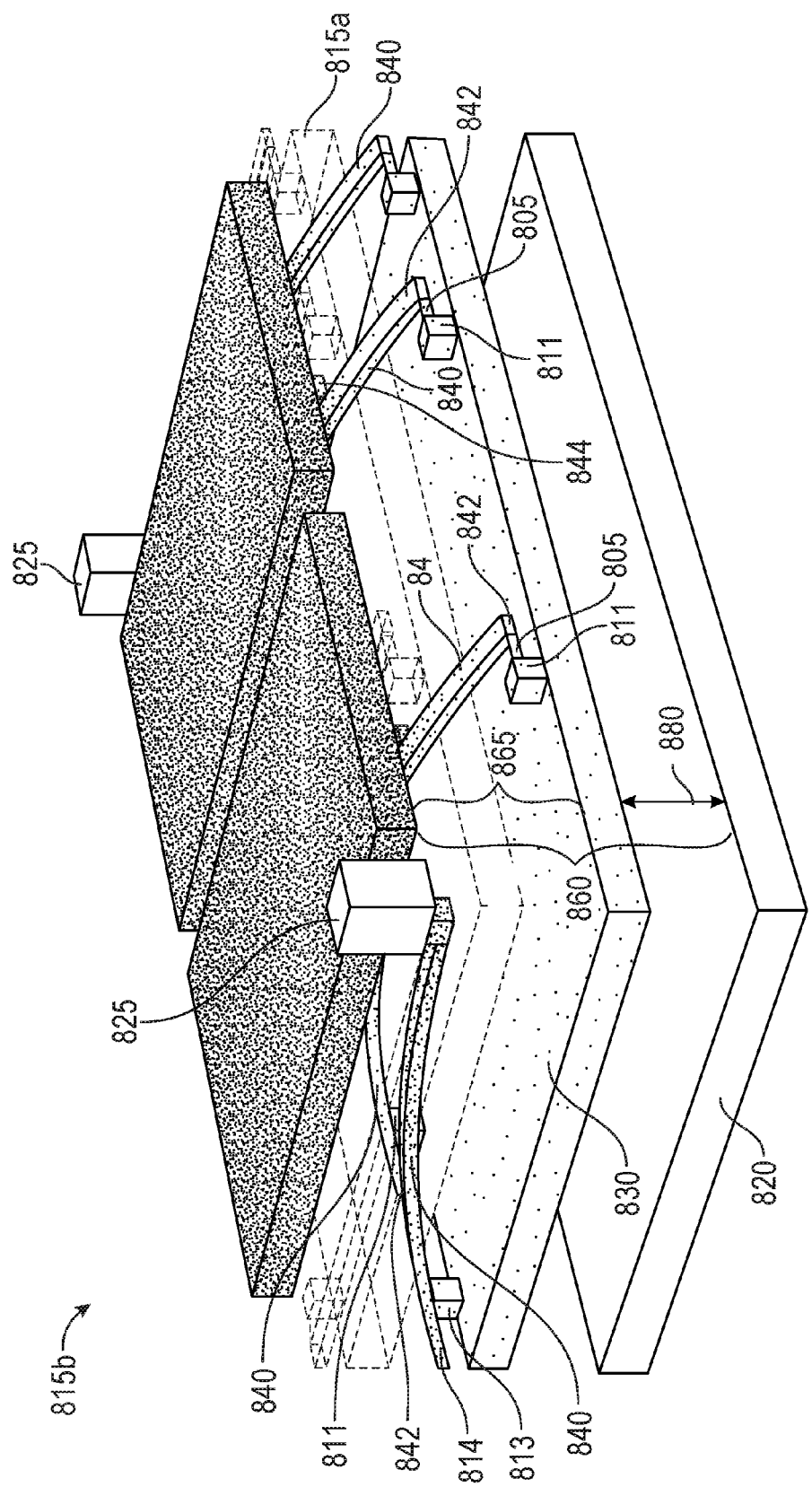

FIG. 8A illustrates four sensors 815; however, any number of sensors 815 may be used. For example, FIG. 8B illustrates a perspective view of two sensors 815a of the array of sensors in a first state. FIG. 8C illustrates a perspective view of the two sensors 815a of FIG. 8B with the movable layers 850 removed for illustrative purposes. FIG. 8D illustrates a perspective view of the sensor 815a of FIG. 3B in a second state (e.g., sensors 815b).

Sensors 815 are configured to be substantially similar to the sensors disclosed in the present disclosure (e.g., sensors 715 of FIG. 7), except as provided in reference to FIGS. 8A-8D. For example, the first state illustrated in FIG. 8B may be a zero state, wherein no radiation is incident upon sensors 815 (e.g., two sensors 815). The second state shown in FIG. 8D may be an activated state, wherein sensors 815b (e.g., two sensors 815b) receives incident radiation and experiences a temperature change. In some embodiments, sensors 815b in the active state may be configured to generate a signal indicative of an amount of or change in incident radiation based on detecting the radiation emitted from an object. As described above, it should be appreciated that while the following discussion is made with reference to the single sensors 815 of FIGS. 8B-8D, the same principles and concepts apply to any one or more of the sensors in the array of sensors described throughout the present disclosure.

Returning to FIGS. 8B and 8C, the sensors 815a may comprise a frame 830 connected to the substrate 820 via a plurality of first beams 801. In some embodiments, the substrate 820 need not be planar and may comprise a raised portion 821 for facilitating connection of the various components as illustrated in FIG. 8A. The substrate 820 may be connected to the plurality of first beams 801 in various ways. For example, in some embodiments, the raised portion 821 may be fixedly attached to the connection region 825. In some embodiments, a region of the substrate 820 may be fixedly attached to the connection region 825. A first end 809 of each first beam 801 may be connected to the substrate 820 at connection region 825. A second end 808 of the first beams 801 may be coupled to the frame 830 by a connector 807 that may be substantially similar to connector 707 of FIG. 7. The connector 807 may attached to the frame 830 at connection region 813. The first beams 801 may be configured to allow the frame 830 to move through a gap 880, away from or towards the substrate 820 based on the thermal expansion of the frame 830 and/or first beams 801. At least in part due to the first beams 801, the frame 830 may be at least partially isolated from movement in the substrate 820. Thus, the frame 830 supported by first beams 801 may be configured to move through gap 880 to counteract or minimize the common mode ambient temperature changes of the sensors 815.

Each sensor 815 may comprise one or more movable layers 850 coupled to the second side 834 of frame 830 by a plurality of second beams 840. Each of the second beams 840 may include a first end 842 connected to the second side 834 of the frame 830 by a connector 805 and a second end 844 coupled to the movable layer 850 via second end 844. The movable layers 850 may be substantially similar to the movable layers and sensing elements disclosed throughout the present disclosure (e.g., sensing elements 450 and 550 of FIGS. 4A-5 respectively) and configured to receive incident radiation, which may be transferred through thermal conduction to the second beams 840 via the second end 844. This may cause the second beams 840 to bend, as illustrated in FIG. 8D, thereby causing the movable layers 850 to move through a gap 865 between the frame 830 and movable layer 850. The gap 865 may be indicative of an amount of radiation emitted from an object being imaged (e.g., radiation 155 from object 150 of FIG. 1). In some embodiments, the movable layers 850 may be operatively coupled to a sensing circuit (e.g., sensing circuit 140 of FIG. 1) and configured to produce an interferometric modulation (IMOD) effect that may be viewed by the user on the viewing side (e.g., the optical readout of an IR camera), as described in more detail above with reference to FIGS. 4A and 4B. In another embodiment, the movable layer 850 may be operatively coupled to a sensing circuit (e.g., sensing circuit 140 of FIG. 1) and configured to produce an output voltage difference based on gap 860, as described in more detail above with reference to FIG. 5.

In some embodiments, the substrate 820 may be substantially similar to the substrate 720 of FIG. 7. As described above, the substrate 820 may have a first and second side 822 and 824, respectively. In some embodiments, the substrate 820 comprises a material composition configured to be transparent to visible radiation or light (e.g., a glass, polymer, or other transparent flexible material). While FIGS. 8A-8D illustrate the frame 830 disposed on the second side 824 of substrate 820, other arrangements are possible and is not intended to be limiting. For example, it is envisioned that the frame 830, and sensors 815, may be disposed on the first side 822 of substrate 820 via connection region 825.

As illustrated in FIGS. 8B-8D, the frame 830 may be substantially similar to the frame 730 of FIG. 7. The frame 830 may be a single frame structure having a first side 832 and a second side 834 having a plurality of sensors 815 disposed thereon. In some embodiments, multiple frames 830 may be provided, each frame comprising a plurality of sensors 815.

In some embodiments, the frame 830 is coupled to the second side 824 of the substrate 820 by one or more first beams 801. The first beams 801 may be substantially similar to the first beams 701 of FIG. 7. The first beams 701 may be configured to allow the frame 830 to move, away from and towards the substrate 820, in a direction substantially perpendicular to the second side 824. In various embodiments, the first beams 801 may be configured to at least partially or completely isolate the frame 830 from movement of the substrate 820 caused by changes in temperature of the substrate 820. In other embodiments, alternatively or in combination, the first beams 701 may be configured to counteract or minimize the common mode ambient temperature, as described above. For example, radiation may be incident on the substrate 820 and the frame 830, resulting in movement and or thermal expansion of the substrate 820 and frame 830. However, thermal expansion of the frame 830 may be isolated from the thermal expansion of the substrate 820 via the first beams 801 and/or the connector 807. Accordingly, the frame 830 may be permitted to move, expand, or contract, based on its CTE, freely or independent of the movement in the substrate 820. Therefore, in some embodiments, such isolation of the frame 830 from substrate 820 may represent at least one means for at least partially isolating.

In the embodiment of FIGS. 8B-8D, each sensor 815 may be coupled to the second side 834 of the frame 830 by one or more second beams 840 (e.g., two beams are illustrated for each sensors 815 in FIGS. 8B-8D). However, the number of second beams need not be so limited, and may be any number of beams necessary to carry out the various processes and operations disclosed in the present disclosure (e.g., 2, 3, 4, 5, etc.). The second beams 840 may be substantially similar to the second beams 740 of FIG. 7.

Each second beam 840 may comprise a first end 842 and a second end 844, where the first end 842 is coupled to the frame 830 by a connector 805. In some embodiments, the connector 805 may connect to a connection region 811 on the second side 834 of the frame 830. The connector 805 may be substantially similar to connector 705 of FIG. 7 and may be configured to thermally isolate the corresponding sensor 815 from the frame 830. As described above in connection with FIG. 7, the second beams 840 may comprise a material composition configured to cause the second beam 840 to bend in a direction substantially perpendicular to the substrate 820 in response to changes in temperature along the second beams 840 based on incident radiation. Therefore, the second beam 840 may represent at least one example of a bending means.

In the embodiment, each sensor 815 includes one or more movable layers 850. In some embodiments, the movable layer 850 may be thermally coupled to the second end 844 of one or more beams 840 to thermally conduct heat absorbed by the movable layer to the beams 840. As illustrated in FIGS. 8B-8D, each sensor 815 may include a single movable layer 850. However, this is for illustrative purposes only, and is not intended to be limiting. Any number of movable layers 850 may be used in accordance with the embodiments herein. In some embodiments, movable layers 850 may be symmetric so that the temperature across each movable layer, and as thermally conducted to each beam, remains constant or substantially similar at operating temperatures. In some embodiments, the movable layers 850 may have a thickness and surface area that is large relative to the second beams 840 and frame 830. The thickness of the movable layers 850 may be selected to reduce bending of movable layers 850 which may, in part, reduce any bi-material effects in the movable layers 850. In some embodiments, the surface area of movable layers 850 may be selected to facilitate absorption of an increased, amount of incident radiation, which may be transferred as heat to other components of the sensors 815, as disclosed herein. In some embodiments, movable layers 850 may operate in resonant or broadband absorption of incident radiation. In some embodiments, the movable layers 850 may be at least one sensing means.

FIG. 8D illustrates a perspective view of the response of the sensors 815b to a temperature difference of 1 Kelvin between an object and the surrounding environment. In this example, the sensors 815b may be part of a thermal imaging camera (e.g., thermal imaging device 100), which may include an IR optical element having an f/# of 1. The sensors 815b are depicted as a square sensors having a length and a width dimension of 100 microns, respectively, and the beams 801 and 840 each having a thickness that is relatively thin with respect to the thickness of the substrate 820. FIG. 8D also depicts an example greyscale color gradient illustrative of a relative degree of bending in the first or second beams 801 and 840 (e.g., a smaller bending illustrated in white and a greater amount of bending illustrated in darker grey) based on the bend of the beams 801 and 840 in response to the temperature difference of 1 Kelvin. As illustrated, the bending of beams 840 causes the movable layers 850 to be displaced by a substantially similar distance and the bending of beams 801 causes the frame 830 to be displaced by a substantially similar distance. While FIG. 8D illustrates an example sensors 815b having dimensions as described above, the dimensions are not intended to be limiting, but are provided merely as an illustrative example. Other dimensions are possible, and the various components of sensors 815b may scale in accordance with the size of the sensors 815. For example, beams 801 and 840 may have a thickness between 0.1 micron and one micron, or in some embodiments the thickness may be greater than one (1) micron.

FIG. 8D depicts beams 840 bent so as to displace of the movable layers 850 by approximately 0.5 to 5 microns e.g., (gap 865) relative to the frame 830 in response to the 1 Kelvin temperature difference. FIG. 8D also depicts beams 801 bent so as to displaced 5 nanometers (e.g., gap 880) relative, and in the opposite direction than the deflection of the movable layers 850, to the substrate 820 in response to the 1 Kelvin temperature difference. For example, the environment produces ambient radiation and the object emits its own radiation. The combined incident radiation may be received by each of the components of the FPA 810, as described herein. The components may then absorb the radiation, causing each component to change temperature based on its corresponding CTE. This temperature change induces thermal expansion and movement in the various components of the FPA 810.

As described above, the frame 830 may be isolated from the substrate 820 via the first beam 801, which permits the frame 830, the second beams 840, and movable layers 850 to move at least partially independent of the movement in the substrate 820. The various components may move, expand, or contract freely from movement in the substrate 820 due to temperature changes in the substrate 820. For example, the movable layers 850 may collect incident radiation and channel the thermal energy into the second beams 840 such that the second beams 840 bend relative to the frame 830 and move the movable layers 850 through gap 865. The first beams 801 may also experience a temperature change causing them to bend relative to the substrate 820 and move the frame 830, in a substantially opposite direction than the movement in the movable layer 850, relative to the substrate 820 and through gap 880 (e.g., as illustrated in FIG. 8D the first beam 801 bends to push the frame downward toward the second side 824 of the substrate 820). Thus, in the example illustrated in FIG. 8D, the gap 860 remains substantially constant, and the movable layer 850 may be held in a constant position relative to the substrate 820. The movable layer 850 may be configured to produce an output, based on the gap 860, indicative of the temperature difference between the movable layer 850 and the frame 830. Accordingly, the gap 860 may be indicative of a temperature difference across the object and an amount of radiation emitted by the object. Movement of the frame 830 relative to the movable layer 850 is configured to at least partially compensate for temperature changes due to the ambient. Thus, the first beam 801 may be one means for minimizing, partially or full cancelling, or partially or fully compensating for thermal due to the ambient radiation.

Block Diagram of an Example Thermal Imaging Device

FIG. 9 is a block diagram illustrating an example of a thermal imaging device 900 that includes a thermal imaging sensor 910. In this example, the thermal imaging device 900 includes an image processor 942 coupled to the thermal imaging sensor 910. The thermal imaging device 900 also may include a working memory 946, storage module 960, a display 920, and a memory 950 that includes stored information for configuring the image processor 942 or a device processor 944, all coupled to and in communication with the image processor 942. In some embodiments including the illustrated embodiment in FIG. 9, components of the thermal imaging device 900, including the display 920 and storage module 960, may be coupled to and/or in communication with the image processor 942 via a device processor 944. In this example, memory 950 includes modules having instructions to configure the image processor to perform various operations.

In various embodiments, the thermal imaging device 900 may be a computer, cell phone, digital camera, tablet computer, personal digital assistant, or the like. In some embodiments, the thermal imaging device 900 may be included in a robot, automotive vehicle (e.g., self-driving vehicles or vehicles driven by a user), unmanned aerial vehicles (UAVs), or the like. A plurality of imaging applications may be available to the user on thermal imaging device 900. These applications may include traditional photographic and video applications, high dynamic range imaging, panoramic photo and video, stereoscopic imaging such as 3D images or 3D video, or multispectral imaging, to name a few. The thermal imaging device 900 as illustrated includes the thermal imaging sensor 910 for capturing external images. The thermal imaging sensor 910 may include various components that are not explicitly shown in FIG. 9 for clarity, including for example a sensor, a lens assembly, and autofocus module. In various embodiments, the thermal imaging sensor 910 may be an FPA, as described in throughout the present disclosure, comprising a plurality of sensors that may be any one of or a combination of one or more of the sensors as described throughout the present disclosure (e.g., sensors 215 of FIG. 2, sensors 315 of FIGS. 3A-3C, sensors 615 of FIGS. 6A-6C, sensors 715 of FIG. 7, and sensors 815 of FIGS. 8A-8C). The thermal imaging sensor 910 may also comprise any one of, either individually or in combination, signal elements, movable layers, sensing elements, and/or sensing circuits as described herein (e.g., sensing elements 450 or 550 of FIGS. 4A-5 and sensing circuits 140, 540 of FIGS. 1 and 5, respectively). In some embodiments, the thermal imaging device 900 includes another camera (not shown) that is configured to capture images from received light in the range of visible wavelengths. The thermal imaging sensor 910 and the other camera are configured with different components (for example, optics, sensors) and thus produce images that are formed based on their own particular optics and sensor. Thus, the target image scene may be captured as a set of images in which the thermal imaging sensor 910 captures an image A according to the sensor's intensity response and the other camera captures image B according to the sensor's intensity response.

The image processor 942 may be configured to perform various processing operations on received image data including a number of images of the image scene in order to output an accurately aligned image set, as will be described in more detail below. Image processor 942 may be a general purpose processing unit or a processor specially designed for imaging applications. Examples of image processing operations include cropping, scaling (e.g., to a different resolution), image stitching, image format conversion, color interpolation, color processing, image filtering (e.g., spatial image filtering), lens artifact or defect correction, etc. Image processor 942 may, in some embodiments, comprise a plurality of processors. Certain embodiments may have a processor dedicated to each image sensor. Image processor 942 may be one or more dedicated image signal processors (ISPs) or a software implementation of a processor.

Image processor 942 is connected to a memory 950 and the working memory 946. In the illustrated example, the memory 950 stores thermal sensor processing information module 952 and operating system module 954. These modules include instructions that configure the image processor 942 and/or device processor 944 to perform various image processing and device management tasks. Working memory 946 may be used by image processor 942 to store a working set of processor instructions contained in the modules of memory 950. Alternatively, working memory 946 may also be used by image processor 942 to store dynamic data created during the operation of thermal imaging device 900.

Operating system module 954 may configure the image processor 942 to manage the working memory 946 and the processing resources of the thermal imaging device 900 for various operational tasks. For example, operating system module 954 may include device drivers to manage hardware resources such as the thermal imaging sensor 910. Therefore, in some embodiments, instructions contained in the image processing modules discussed above may not interact with these hardware resources directly, but instead interact through standard subroutines or APIs located in operating system module 954. Instructions within operating system module 954 may then interact directly with these hardware components. Operating system module 954 may further configure the image processor 942 to share information with device processor 944.

Device processor 944 may be configured to control the display 920 to display the captured image, or a preview of the captured image, to a user. The display 920 may be external to the thermal imaging device 900 or may be part of the thermal imaging device 900. The display 920 may also be configured to provide a view finder displaying a preview image for a use prior to capturing an image, or may be configured to display a captured image stored in memory or recently captured by the user. The display 920 may comprise, for example, an LCD or LED screen, and may implement touch sensitive technologies.

Device processor 944 may write data to storage module 960, for example data representing captured images, image alignment data, intensity value data, measured voltages, and the like. While storage module 960 is represented graphically as a traditional disk device, those with skill in the art would understand that the storage module 960 may be configured as any storage media device. For example, the storage module 960 may include a disk drive, such as a floppy disk drive, hard disk drive, optical disk drive or magneto-optical disk drive, or a solid state memory such as a FLASH memory, RAM, ROM, and/or EEPROM. The storage module 960 can also include multiple memory units, and any one of the memory units may be configured to be within the thermal imaging device 900, or may be external to the thermal imaging device 900. For example, the storage module 960 may include a ROM memory containing system program instructions stored within the thermal imaging device 900. The storage module 960 may also include memory cards or high speed memories configured to store captured images which may be removable from the thermal imaging device 900.

Although FIG. 9 depicts a device having separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance. Additionally, although FIG. 6 illustrates two memory components, including memory 950 including several modules and a separate working memory 946, other embodiments may utilize different memory architectures. For example, a design may include ROM or static RAM memory for the storage of processor instructions implementing the modules contained in memory 950. The processor instructions may be loaded into RAM to facilitate execution by the image processor 942. For example, working memory 946 may comprise RAM memory, with instructions loaded into working memory 946 before execution by the processor 942.

Example Method of Sensing Radiation from an Object

Figure 10:
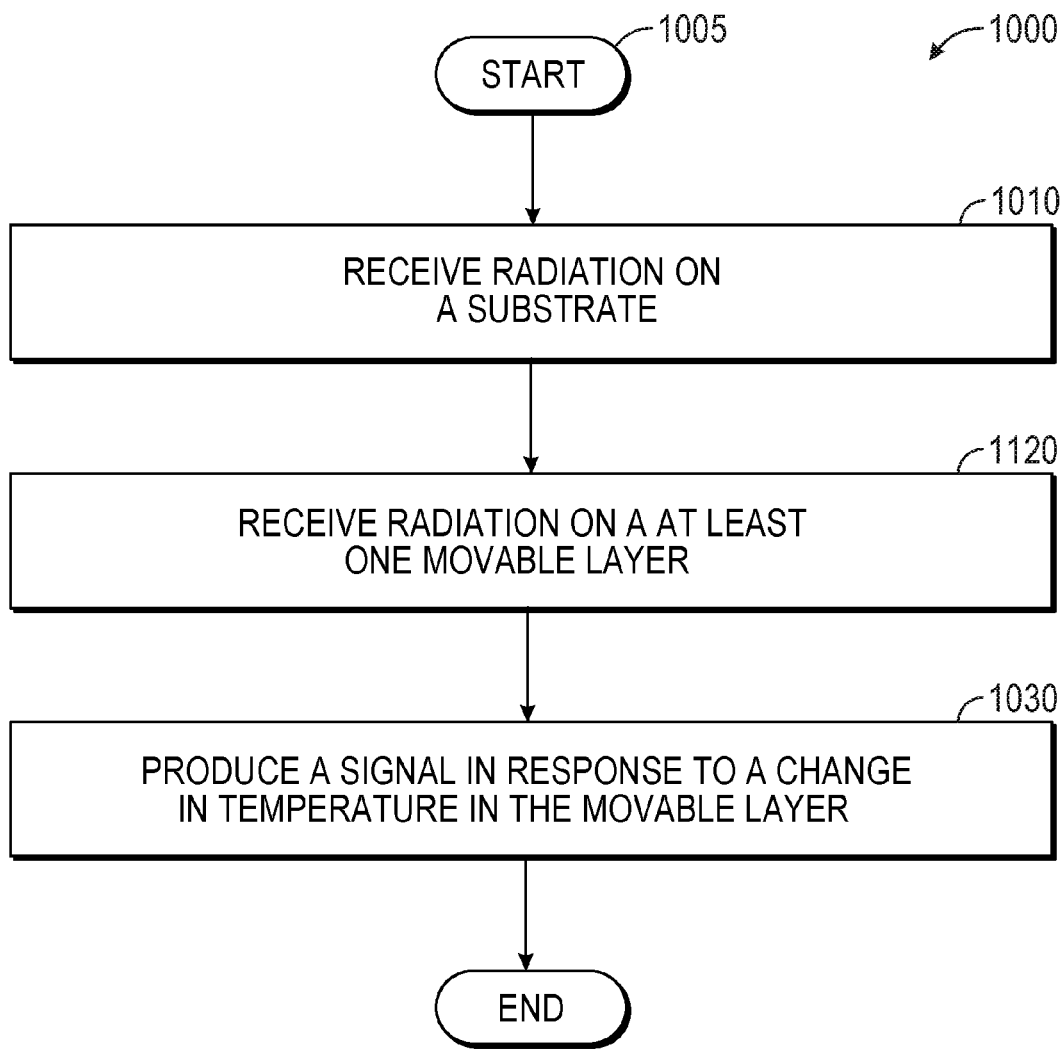
FIG. 10 is a flowchart of an example method for sensing radiation from an object in accordance with some embodiments.

FIG. 10 is a flowchart of an example method 1000 for sensing radiation emitted by an object in accordance with one embodiment. The method 1000 may be performed by a thermal imaging device 100 of FIG. 1 and/or thermal imaging device 900 of FIG. 9. In some embodiment, the method 1000 may be implemented by one or more of the various embodiments of the FPA described throughout the present disclosure (e.g., FPA 210 of FIG. 2, FPA 310 of FIG. 3, FPA 710 of FIG. 7, FPA 810 of FIG. 8, etc.). However, it will be understood that the various FPAs disclosed herein are intended as example embodiments, and the specific structures described above are not intended to be limiting. The method 1000 can be implemented in conjunction with a software solution by the memory 950 and/or 946 of FIG. 9, as described above, or implemented elsewhere in the a thermal imaging device 900, for example one or more processors executed by a logic device in processor 942 and or 944.

The method 1000 begins at start block 1005 and then moves to block 1010, where radiation is received on a substrate. In some embodiments, the substrate may comprise a first and second side, wherein the second side may be configured to receive incident radiation. The substrate may be substantially similar to the various substrates described in the present disclosure (e.g., substrate 220 of FIG. 2, substrate 720 of FIG. 7, etc.).

After, or while, the radiation is received by the substrate, the method 1000 moves to block 1020 where radiation is received on at least one movable layer. In some embodiments, the at least one movable layer receives radiation at least partially from an object. In some embodiments, the at least one movable layer is part of multiple movable layers included in a signal element, for example, as described in the present disclosure in reference to FIGS. 1-3C, 6A-6C, and 7-8D. In various embodiments, the at least one movable element maybe coupled to a frame that is substantially similar to the various frames described in the present disclosure (e.g., frame 230 of FIG. 2, frame 730 of FIG. 7, etc.), which may be coupled to the substrate (e.g., coupled to the first or second side of the substrate as described in the present disclosure).

After the radiation is received by the at least on moveable layer, the method 1000 moves to block 1030 where a signal is produced in response to a change in temperature in the movable layer. For example, the signal may be produced responsive to the position of the at least one movable layer in response to a change in temperature in the movable layer. In some embodiments, the signal may be produced by a sensor, a signal element, and/or one or more movable layers, as described throughout the present application. In some embodiments, the signal may be indicative of the radiation emitted by the object. For example, the signal may be indicative of the response of the sensing element and/or each of the movable layers independently moving in response to received radiation. In some embodiments, the signal may be received by a sensing circuit (e.g., sensing circuits, 140, 440, and/or 540 of FIGS. 1, 4B, and 5, respectively.) After the signal is produced the method 1000 ends at block 1050.

In some embodiments, the moveable layer is moved to the position in response to a change in temperature, for example, in the moveable layer. In another embodiment, alternatively or in combination, the moveable layer may be coupled to one end of a beam, a second end of the beam coupled to the frame, and thermal energy in the at least one moveable layer from the radiation may be conducted into the beam. The beam may be substantially similar to the various beams described in the present disclosure (e.g., beams 240 of FIG. 2, beams 701 and/or 740 of FIG. 7, etc.). The beam may deformed in response to a temperature change due to the conducted thermal energy. In some embodiments, the deformation of the beam may move the moveable layer to a position relative to the substrate.

Implementing Systems and Terminology

Implementations disclosed herein provide systems, methods, and apparatus for actively and optimally aligning an optical system during assembly. One skilled in the art will recognize that these embodiments may be implemented in hardware, software, firmware, or any combination thereof.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, two or more image signal processors, a memory including instructions or modules for carrying out the CNR process discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without author input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the objective function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A device for sensing thermal radiation emitted by an object, comprising:
   a substrate;
   a plurality of movable layers configured to receive thermal radiation from the object and move relative to the substrate to a position in response to a change in received thermal radiation;
   a sensor configured to produce a signal responsive to the position of the movable layer, the signal indicative of the thermal-radiation emitted by the object; and
   a frame coupled to the substrate and the plurality of movable layers, wherein the frame is thermally isolated from the substrate and the plurality of movable layers.

2. The device of claim 1, wherein the movable layer comprises an absorber layer configured to absorb infrared radiation.

3. The device of claim 2, wherein the movable layer further comprises a reflector that is partially transmissive and partially reflective of visible light.

4. The device of claim 3, wherein the substrate comprises a first side and a second side, the second side being proximate to the movable layer, and wherein the device further comprises a visible light absorber layer positioned between the reflector and the first side of the substrate.

5. The device of claim 4, wherein the sensor comprises a light sensing element configured to detect an optical signal indicative of the position of the movable layer.

6. The device of claim 2, wherein the substrate comprises a first side and a second side, the second side being proximate to the movable layer, wherein the movable layer comprises a conductive layer positioned between the absorber layer and the second side of the substrate, wherein the sensor includes a conductor disposed on the second side of the substrate and in electrical communication with the conductive layer, and wherein the sensor is configured to produce the signal based on a difference in capacitance as measured between the conductive layer and the sensor.

7. The device of claim 1, wherein the movable layer is configured to move relative to the frame in response to thermal radiation emitted by the object, and wherein the frame is configured to move relative to the substrate in response to ambient radiation incident on the device.

8. The device of claim 1, further comprising a plurality of beams each having a first end and a second end, each beam coupled at a first end to the frame, and each beam coupled at a second end to the movable layer.

9. The device of claim 8, wherein the coupling of the second end to the movable layer is configured to conduct thermal energy from the movable layer to the beam, each beam being configured to deform in response to a temperature change of the beam.

10. The device of claim 9, wherein the deformation of the plurality of beams moves the movable layer relative to the substrate.

11. The device of claim 8, wherein the movable layer includes a plurality of planar structures each coupled to one or more of the plurality of beams.

12. The device of claim 8, wherein each of the plurality of beams comprise a mechanical discontinuity, the mechanical discontinuity causing the beam to change the position of the movable layer relative to the substrate in response to the temperature change of the beam.

13. A method for sensing thermal radiation emitted by an object, the method comprising:
   receiving radiation on a substrate coupled to a frame by a hinge configured to isolate the frame from contraction and expansion in the substrate;
   receiving radiation from the object on a plurality of movable layers, the movable layers coupled to and thermally isolated from the frame; and
   producing a signal, by a sensor, responsive to a change in position of the movable layers relative to the substrate in response to a change in received thermal radiation, the signal indicative of the thermal radiation emitted by the object.

14. The method of claim 13, wherein the movable layer is coupled to the substrate by a beam, the movable layer configured to conduct thermal energy from the movable layer to the beam causing the beam to deform in response to a change in temperature.

15. The method of claim 14, wherein deforming the beam moves the movable layer, coupled to the beam, relative to the substrate.

16. A device for sensing thermal radiation emitted by an object, comprising:
   first means for receiving radiation coupled to a third means by a fourth means configured to isolate the third means from contraction and expansion in the first means;
   second means for receiving radiation coupled to and thermally isolated from the third means;
   and
   means for producing a signal responsive to a change in position of the second means for receiving radiation relative to the first means for receiving radiation, the signal indicative of the thermal radiation emitted by the object.

17. A device for sensing thermal radiation emitted by an object, comprising:
   a substrate;
   a movable layer configured to receive thermal radiation from the object;
   a plurality of beams each having a first end coupled to the substrate and a second end coupled to the movable layer, wherein each beam is configured to
   receive thermal energy from the moveable layer,
   deform in response to a change in received thermal energy, and
   thereby move the moveable layer relative to the substrate; and
   a sensor configured to produce a signal responsive to movement of the movable layer relative to the substrate, the signal indicative of the thermal radiation emitted by the object.

18. The device of claim 17, wherein the moveable layer comprises a plurality of sensing elements.

19. The device of claim 17, wherein the sensor is configured to produce an interferometric modulation effect based on a distance between the moveable layer and the substrate.

20. The device of claim 17, wherein each of the plurality of beams comprises an elongated beam having a length between the first and second ends that is longer than its width.

21. The device of claim 17, wherein each of the plurality of beams comprises a discontinuity configured to deform the respective beam in a specific direction.

22. The device of claim 17, wherein each of the plurality of beams is coupled to the substrate with a connector configured to thermally isolate the respective beam from the substrate.

23. The device of claim 17, wherein each of the plurality of beams is coupled to the substrate with a frame coupled at one end to the respective beam and at another end to the substrate.

24. A method for sensing thermal radiation emitted by an object, the method comprising:

receiving thermal energy on a beam coupled at a first end to a substrate and a second end to a moveable layer;

deforming the beam in response to a change in received thermal energy;

in response to deforming the beam, moving the moveable layer relative to the substrate; and producing a signal, by a sensor, responsive to movement of the movable layer relative to the substrate and indicative of thermal radiation emitted by the object.

25. A device for sensing thermal radiation emitted by an object, comprising:

a first means for receiving thermal energy, the first means coupled at a first end to a second means and at a second end to a third means, deforming in response to a change in received thermal energy, and in response to deforming, moving the third means relative to the second means; and a fourth means for producing a signal responsive to movement of the third means relative to the seconds means and indicative of thermal radiation emitted by the object.

* * * * *